United States Patent

Stemme et al.

[11] Patent Number: 6,124,145
[45] Date of Patent: Sep. 26, 2000

[54] MICROMACHINED GAS-FILLED CHAMBERS AND METHOD OF MICROFABRICATION

[75] Inventors: Göran Stemme, Stockholm; Edvard Kälvesten, Hägersten, both of Sweden

[73] Assignee: Instrumentarium Corporation, Helsinki, Finland

[21] Appl. No.: 09/012,660

[22] Filed: Jan. 23, 1998

[51] Int. Cl.[7] ............................. G01R 31/26; H01L 21/66
[52] U.S. Cl. ................................. 438/26; 438/22; 438/25
[58] Field of Search .................................. 438/26, 22, 25

[56] References Cited

U.S. PATENT DOCUMENTS

| | | |
|---|---|---|
| 3,745,349 | 7/1973 | Liston . |
| 4,084,096 | 4/1978 | Edwards . |
| 4,914,720 | 4/1990 | Knodle et al. . |
| 4,943,032 | 7/1990 | Zdeblick . |
| 5,285,131 | 2/1994 | Muller et al. . |
| 5,668,376 | 9/1997 | Weckstrom et al. . |
| 5,768,083 | 6/1998 | Maki et al. . |

FOREIGN PATENT DOCUMENTS

| | | |
|---|---|---|
| 125859 | 11/1984 | European Pat. Off. . |
| 469733 | 2/1992 | European Pat. Off. . |
| 581376 | 2/1994 | European Pat. Off. . |
| 689229 | 12/1995 | European Pat. Off. . |
| 729016 | 8/1996 | European Pat. Off. . |
| 2276975 | 10/1994 | United Kingdom . |
| 90/16082 | 12/1990 | WIPO . |

OTHER PUBLICATIONS

Hot–filament microlamps now feasible; Laser Focus World, Dec. 1992, pp. 26–31.

A Reliable, Accurate $CO_2$ Analyzer for Medical Use; Hewlett–Packard Journal, Sep. 1981, pp. 3–5: R. J. Soloman.

Patent Abstracts of Japan, vol. 097, No. 008, Aug. 29, 1997 & JP 09 089773A (Horiba Ltd.), Apr. 4, 1997.

Huiku et al., "New $CO_2$ filters fabricated by anodic bonding at overpressure in $CO_2$ atmosphere", Sensors and Actuators A, vol. 69, No. 2, Aug. 15, 1998, pp. 166–171 XP004140037.

*Primary Examiner*—Kevin M. Picardat
*Assistant Examiner*—D. M. Collins
*Attorney, Agent, or Firm*—Andrus, Sceales, Starke & Sawall

[57] ABSTRACT

Micromachining, etching and bonding techniques are employed to fabricate hermetically sealed gas-filled chambers from silicon and/or glass wafers. The hermetically sealed gas-filled chambers have precise dimensions and are filled with a preselected concentration of gas, thus rendering exceptional performance for use as an optical gas filter. The first step involves etching one or more cavities or holes in one or more glass or silicon wafers. These wafers eventually become part of a chip assembly having one or more hermetically sealed gas-filled chambers after appropriate bonding procedures. Interfaces between aligned silicon wafers are bonded using fusion bonding techniques whereas interfaces between silicon and glass wafers are bonded using anodic bonding techniques. Bonding is accomplished in an over-pressured gas-filled bonding environment that contains a selected concentration of gas which is maintained at the bonding temperature in order to encapsulate a precise concentration of the gas within the micromachined cavity.

46 Claims, 17 Drawing Sheets

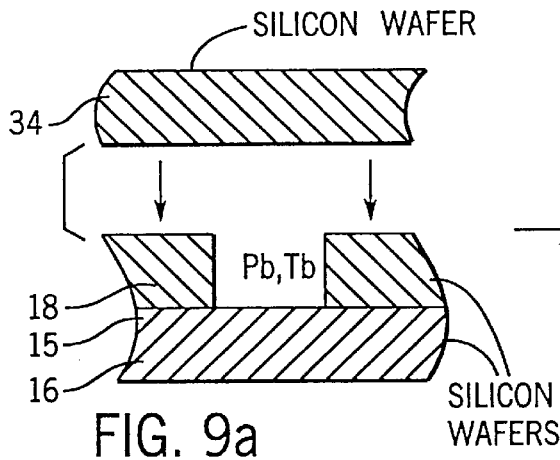
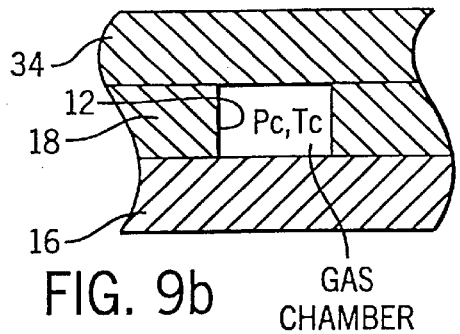
FIG. 9a
FIG. 9b
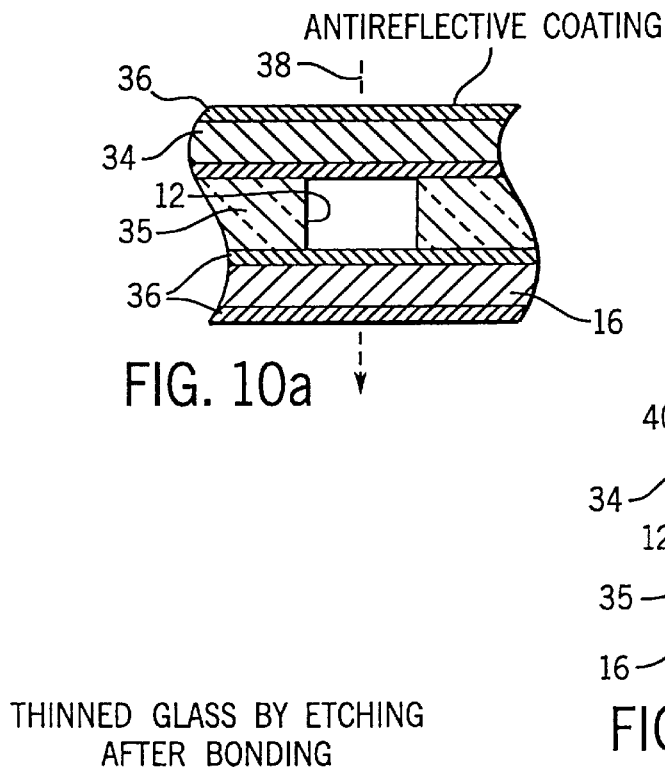
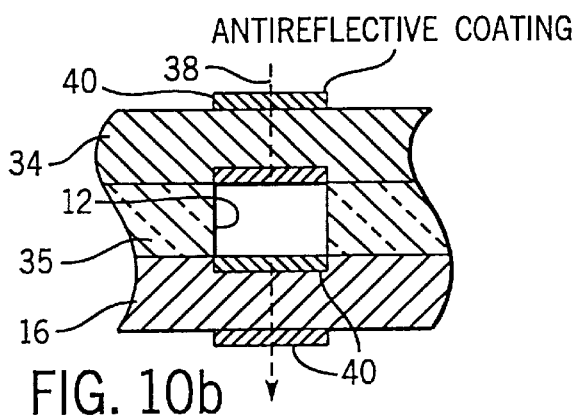
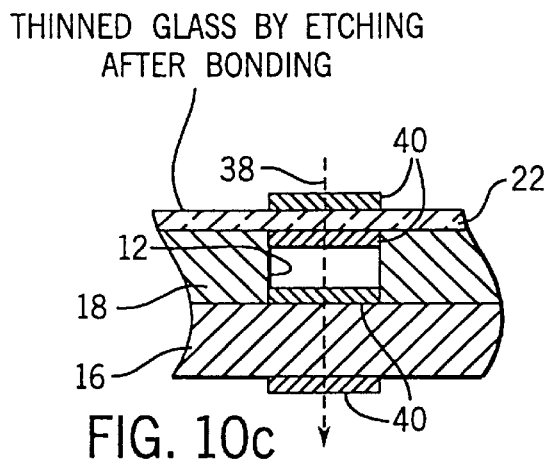
FIG. 10a
FIG. 10b
FIG. 10c

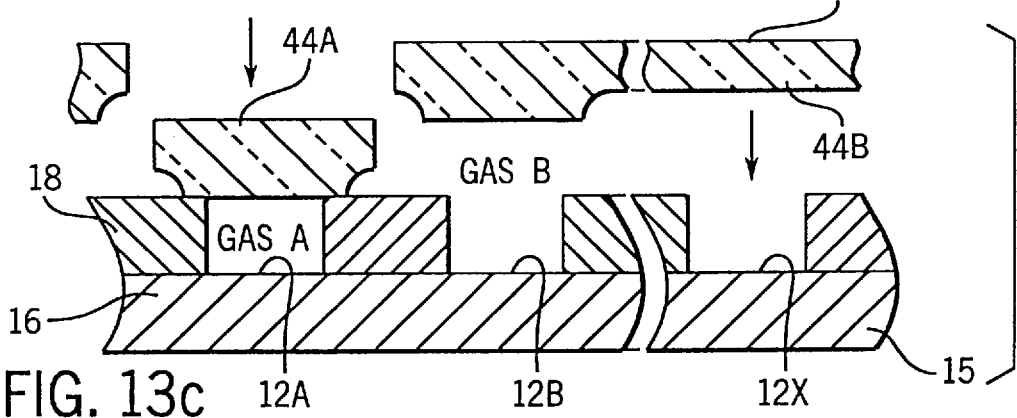
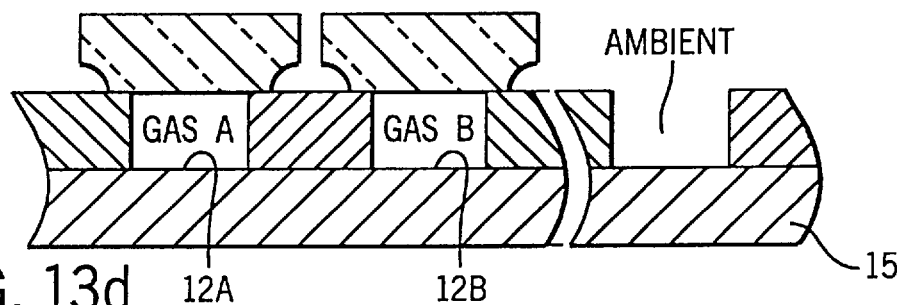
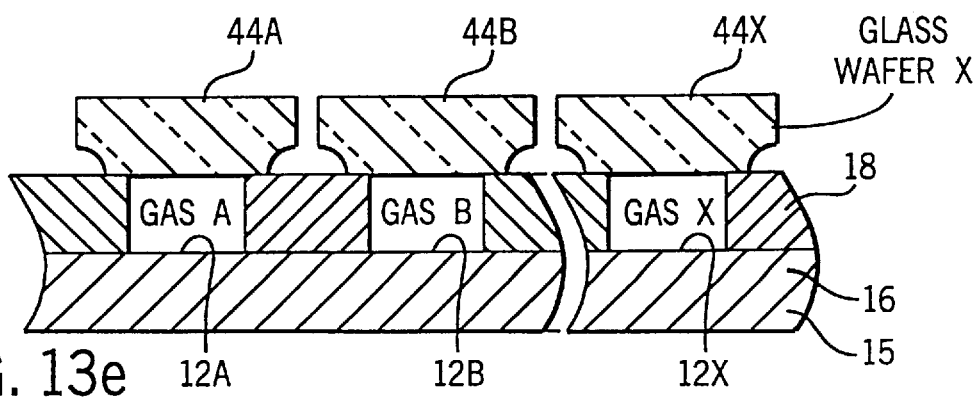

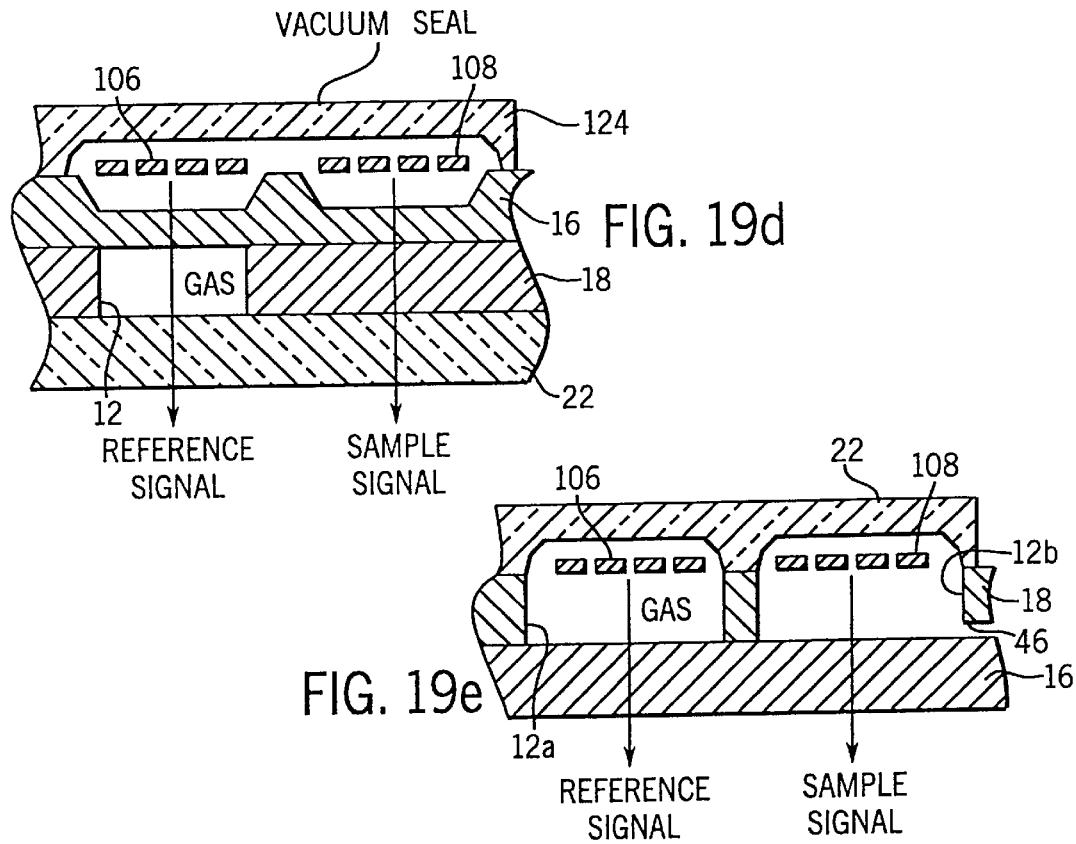
FIG. 19d
FIG. 19e
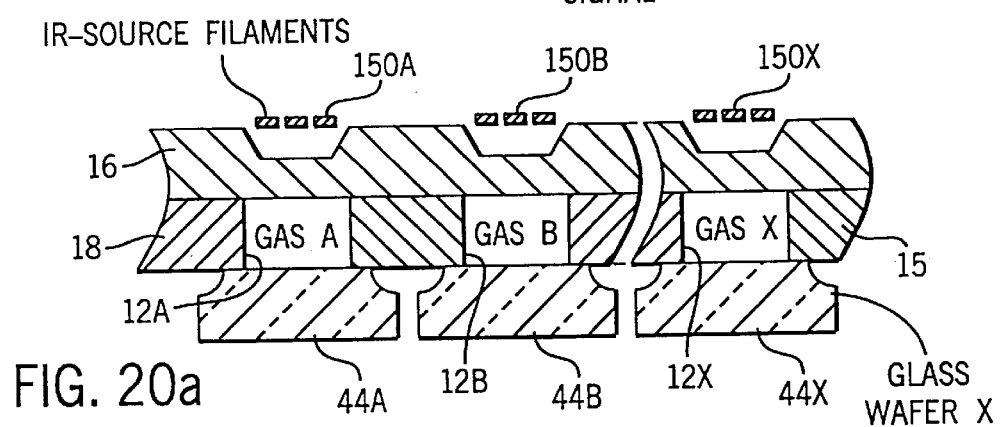
FIG. 20a
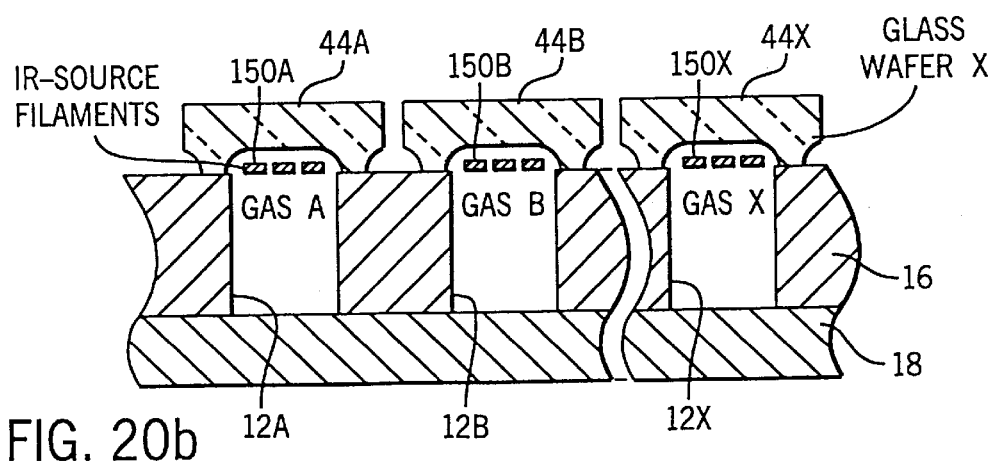
FIG. 20b

MICROMACHINED GAS-FILLED CHAMBERS AND METHOD OF MICROFABRICATION

FIELD OF THE INVENTION

The invention relates to the microfabrication of gas-filled chambers made from silicon and/or glass wafers using anodic and/or fusion bonding techniques. The method is extremely well-suited for microfabricating optical filter components, such as those used in optical transducers to identify and measure the constituents of anaesthetic and breathing gases in medical applications.

BACKGROUND OF THE INVENTION

Optical infra-red filters have become key components for many infra-red sensors. For instance, carbon dioxide filters which consist of a hermetically sealed carbon dioxide filled chamber having windows are used in medical respiratory applications. Such filters are typically expensive and their lifetime is normally limited because the sealing of the chamber has to be made at chip level using adhesives, or other suboptimal bonding technique. The invention was developed in an effort to improve the fabrication of optical gas filters and related components such as infra-red radiation sources using wafer level silicon micromachining techniques which have started to become more practical in recent years.

Micromachining techniques have made it possible to fabricate different micromechanical components having structure details with dimensions of the order of micrometers and main dimensions perhaps on the order of millimeters. Micromachining techniques are related to methods used in the manufacturing of semiconductors, for example various structures are formed in silicon crystal directly by etching with the aid of a protecting mask, or by growing different thin films on the surface of the silicon crystal via vaporizing, sputtering, printing or other thin film techniques known to those who manufacture integrated circuits. The assignee of the present application has been involved in the development of micromachining techniques to fabricate various components for infra-red sensors such as the infra-red radiation source assembly disclosed in U.S. Pat. No. 5,668,376 entitled "Double Radiation Source Assembly And Transducer" by Weckstrom, et al., issued on Sep. 16, 1997 to the assignee of the present application, herein incorporated by reference. The ultimate goal of the invention disclosed in the above-referenced patent, as well as the invention disclosed in this application, is to use wafer level silicon micromachining techniques to improve the fabrication process of gas sensors used to measure respiratory gases present in patients' airways during anesthesia or intensive care. The use of effective micromachining techniques not only leads to miniaturized components, but often also leads to more accurate and durable components.

BRIEF SUMMARY OF THE INVENTION

In one aspect, the invention employs the use of micromachining, etching and bonding techniques to fabricate hermetically sealed gas-filled chambers from silicon and/or glass wafers. The hermetically sealed gas-filled chambers have precise dimensions and are filled with a preselected concentration of gas, thus providing exceptional performance for use as an optical gas filter. The microfabricated gas-filled chambers are also durable. The use of fusion and anodic wafer bonding techniques leads to a completely hermetically sealed chamber which is durable even under conditions in which repeated thermal cycling occurs.

The first step in implementing the invention involves etching one or more cavities (or holes) in one or more glass or silicon wafers. The wafers eventually become part of a chip assembly having one or more hermetically sealed gas-filled chambers after appropriate bonding procedures. Preferably, etching techniques are used to create cavities in a silicon substrate comprised of one or more silicon wafers. Interfaces between aligned silicon wafers are bonded using fusion bonding techniques. The silicon substrate with the etched cavity is then placed within a gas-filled anodic bonding environment. The gas-filled anodic bonding environment contains a selected concentration of gas which is maintained at the anodic bonding temperature $T_{ab}$ and pressure $P_{ab}$ while a glass wafer is aligned on the silicon substrate with the etched cavity. (It may be desirable to replace the glass wafer lid with a silicon wafer having a glass coating.) Voltage is applied to anodically bond the glass wafer to the silicon substrate. During this process, gas from the anodic bonding environment is encapsulated inside of the cavity at the same concentration and pressure that the gas is present in the anodic bonding environment. The composition of the gas within the anodic bonding environment, as well as the concentration and pressure $P_{ab}$ of the gas, is predetermined in order that the composition and concentration of the gas encapsulated within the gas chamber are sufficient for the selected application. For instance, when fabricating a gas-filled chamber which is to be used as an optical gas filter at ambient temperatures (such as used in respiratory gases sensor systems) the anodic bonding environment will typically contain carbon dioxide gas at an inflated pressure such as two atmospheres (i.e. an over-pressurized carbon dioxide environment) thereby allowing the optical gas sensor to obtain a reference signal that exactly matches the absorption spectrum of carbon dioxide. Carbon dioxide gas filters have a strong absorption peak at 4.2 μm. In some embodiments of the invention, the optical path length through the chamber is precisely defined by the thickness of the silicon wafers. In order to obtain maximum absorption, the final anodic bonding is implemented in a bonding environment containing carbon dioxide at a relatively high pressure, thereby allowing more carbon dioxide to be encapsulated in the chamber. Due to the use of carbon dioxide over-pressure in the bonding environment, higher concentrations of carbon dioxide are possible within the chamber, and the chamber can thus be made physically smaller. Depending on the application, the smaller size may significantly simplify fabrication.

Silicon is extremely well-suited for use in carbon dioxide filters because silicon is essentially transparent to radiation having a wavelength $\lambda=4.23$ μm. However, optical transmission losses can occur through the glass and by refraction at the physical interfaces along the optical path. These optical transmission losses can be reduced by thinning the glass wafers through which the radiation passes, and by using anti-reflective coatings such as silicon nitride and silicon dioxide. Silicon dioxide is the preferred coating because silicon dioxide does not affect the quality of fusion or anodic bonds.

As an alternative to anodic bonding a glass wafer lid to the assembly within an over-pressured bonding environment, it may be desirable in some circumstances to enclose the chamber while contemporaneously capturing a preselected concentration of gas in the chamber using a silicon wafer lid. In fabricating such an assembly, it is necessary to chemically treat the silicon wafers. Initial bonding to capture the preselected concentration of gas in the chamber can occur at room temperature. The gas pressure and concentration in the initial bonding environment is substantially the same as the pressure and concentration of the gas captured in the chamber after fabrication. After initial bonding, the silicon wafers are annealed by fusion bonding to strengthen the bond and hermetically seal the chamber. Such a microfabricated structure has the advantage of simplicity, and also has reduced optical transmission losses.

In another aspect of the invention, the above-described techniques are used to microfabricate several gas-filled chambers (e.g. optical gas filters) on a single chip. The fabrication can be accomplished within a single gas-filled bonding environment to create several cells having the same gas composition and concentration. Intentional leaks to the surrounding atmosphere can be micromachined into the chip so that one or more chambers communicate with the atmosphere. In this manner, some chambers on the chip will contain a selected gas (e.g. carbon dioxide gas) at a selected concentration while other chambers will remain open to the surrounding atmosphere. Alternatively, the gas-filled environment bonding technique can be applied in sequence in a variety of gas-filled bonding environments in order that various chambers on the same chip may contain gases of different concentration and/or composition. In the preferred method of implementing this aspect of the invention, it is necessary to saw the wafer used to seal the respective chambers between sequential bonding processes.

In yet another aspect of the invention, the microfabricated gas-filed chamber or plurality of chambers are integrated with one or more infra-red radiation sources on a single chip. The silicon wafer on which the one or more IR sources are microfabricated is preferably used to form part of the chamber which contains the gas. In this manner, an IR source and optical gas filter are efficiently and effectively integrated on a single chip assembly. In many cases, it will be preferred that the single chip assembly include a plurality of laterally disposed IR radiation sources microfabricated on a single wafer and bonded to the remainder of the chip assembly to form the respective gas-filled chambers.

Other features and aspects of the invention will become apparent to those skilled in the art upon reviewing the following drawings and description thereof.

BRIEF DESCRIPTION OF THE DRAWINGS

FIGS. 2, 2a and 2b are schematic drawings illustrating anodic bonding in accordance with the invention within an over-pressured anodic bonding environment designed to provide a customized concentration of gas with the hermetically sealed chamber.

FIGS. 7, 7a, 7b, 7c, 7d, 7e, 7f, 7g, 7h, and 7i schematically illustrate various alternative embodiments for microfabricating a hermetically sealed gas-filled chamber in accordance with the invention.

FIGS. 8, 8a and 8b are schematic drawings illustrating anodic bonding within an over-pressured anodic bonding environment using a silicon substrate having an etched cavity and a silicon wafer having a glass coating to enable anodic bonding.

FIGS. 9, 9a and 9b are schematic drawings illustrating the initial bonding of a silicon substrate having a cavity etched therein and a silicon wafer lid within a gas-filled bonding environment, the initial bonding being later followed by fusion bonding at high temperatures to strengthen the bond.

FIGS. 10, 10a, 10b, and 10c schematically illustrate various methods of applying an anti-reflective coating to reduce refractive optical transmission losses in a gas-filled chamber used as an optical filter.

FIGS. 11, 11a, 11b, and 11c illustrate a single-chip, microfabricated assembly which includes a plurality of chambers (most hermetically sealed and gas-filled) in accordance with the invention.

FIGS. 12, 12a and 12b are schematic drawing illustrating one method of fabricating the single-chip, microfabricated assembly shown in FIG. 11.

FIGS. 13, 13a, 13b, 13c, 13d and 13e contain schematic drawings illustrating the preferred manner of microfabricating the single chip microfabricated assembly shown in FIG. 11.

FIGS. 14, 14a, 14b, and 14c contain schematic drawings showing another embodiment of the single chip microfabricated assembly shown in FIG. 11.

FIGS. 17, 17a, 17b, and 17c are schematic drawings illustrating the preferred steps in fabricating an infra-red radiation source chip having laterally disposed infra-red radiation sources on the same chip.

FIGS. 19, 19a, 19b, 19c, 19d, and 19e contain schematic drawings showing the various embodiments of the invention in which hermetically sealed gas-filled chambers are integrated with a plurality of laterally disposed infra-red radiation sources on a single chip.

FIGS. 20, 20a and 20b are schematic drawing containing various embodiments of the invention in which a plurality of hermetically sealed gas-filled chambers are contained on a single chip and a plurality of laterally disposed infra-red radiation sources are also integrated on the same chip.

DETAILED DESCRIPTION OF THE DRAWINGS

Figure 1A:
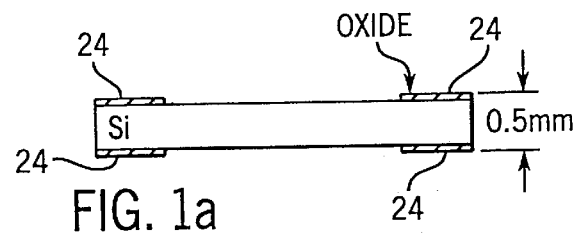
FIGS. 1, 1a, 1b, 1b', 1c, 1c', 1d, and 1d' are schematic drawings illustrating the structure of a microfabricated, hermetically sealed chamber filled with carbon dioxide gas in accordance with the preferred embodiment of the invention.
Figure 1B:
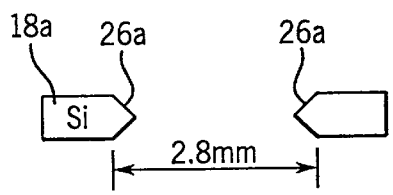
Figure 1B:
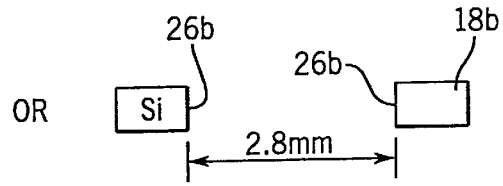
Figure 1C:
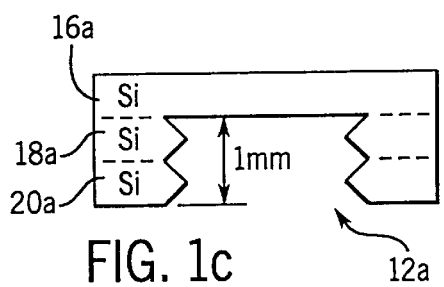
Figure 1C:
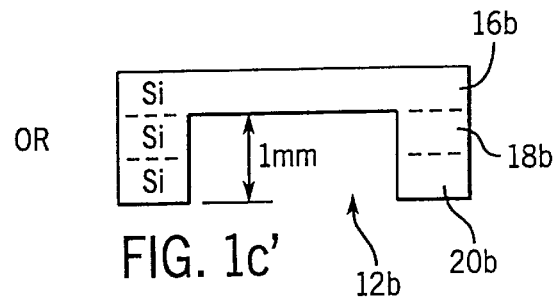
Figure 1D:
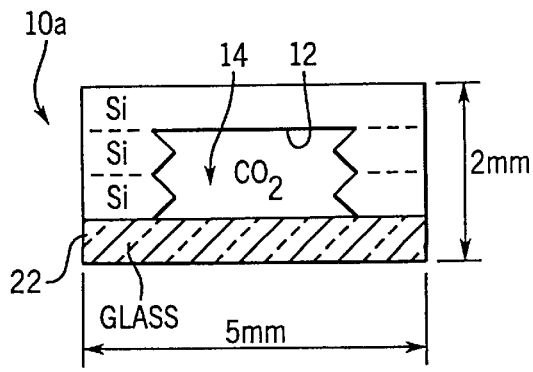
Figure 1D:
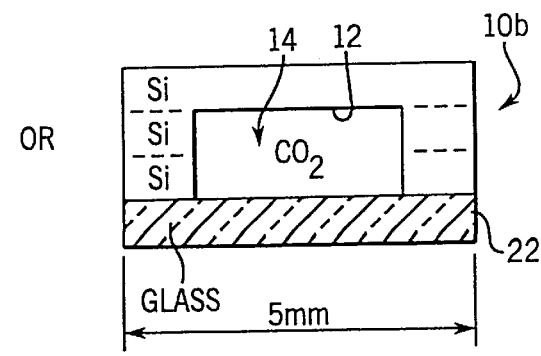

FIGS. 1 through 6 relate to a first embodiment of a microfabricated carbon dioxide optical filter 10a, 10b made in accordance with the invention. The filter 10a, 10b as shown in FIG. 1 comprises carbon dioxide gas 14 encapsulated within a chamber 12. The chamber 12 as shown in FIG.

1 has outer dimensions of approximately 2.8 millimeters× 2.8 millimeters and a cavity depth of 1 millimeter. The filter 10a, 10b is made by etching and bonding three pure, single crystalline silicon wafers 16a, 18a, 20a, (or 16b, 18b, 20b), and a Pyrex glass wafer 22 which are best suited for the bonding techniques disclosed herein.

The microfabrication process for the filter 10a, 10b is shown schematically in FIG. 1. Fabrication starts with the oxidation of two 500 μm thick pure silicon wafers 18a and 20a (or 18b and 20b). An oxide layer 24 is patterned on both sides by double side alignment photolithography, see FIG. 1A. This is followed by standard KOH anisotropic etching to form holes 26a, 26b through the wafers 18a, 20a. Note that by slightly prolonging the etching through the wafers, the inclined walls (26a in FIG. 1B) are eliminated and straight walls 26b (shown in FIG. 1B') are formed instead. After the holes 26a, 26b are formed in the pure silicon wafers 18a and 20a (or 18b and 20b), the remaining oxide layer 24 is removed. The two etched silicon wafers 18a and 20a, or respectively 18b, 20b, are then aligned and joined together using a fusion bonding procedure. The silicon wafer lid 16a or 16b is then fusion bonded to the top wafer 18a (or 18b) having a hole etched therethrough. The result is a triple stack wafer substrate 16a, 18a, 20a (or 16b, 18b, 20b) with a one millimeter deep cavity 12a (or 12b).

In implementing the fusion bonding technique, the bonding surfaces of the silicon wafers are cleaned and pretreated to enable the surfaces to chemically bond with each other. The wafers are then aligned and heated at approximately 1000° C. in a nitrogen atmosphere for several hours to anneal or bond the silicon wafers.

Figures 2A, 2B:
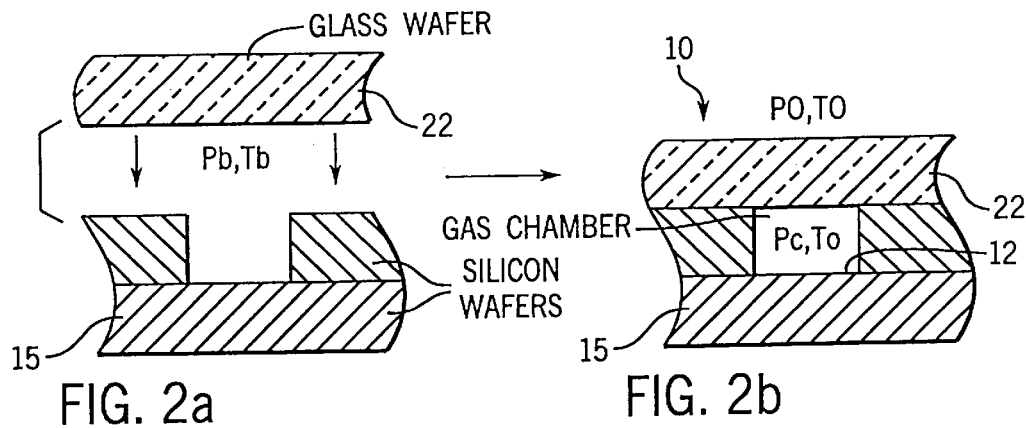

The glass wafer 22, preferably a Pyrex 7740 glass wafer, is then anodically bonded to the triple stack silicon substrate 16a, 18a, 20a using a suitable bonder such as a Karl Suss SB6 Bonder. This bonder has a variable pressure chamber (vacuum to three bar) with an electrostatic option that allows the glass wafer 22 to be separated from the silicon substrate before bonding. Using the electrostatic option, the glass wafer (in vacuum) is separated, and then the variable pressure chamber within the bonder is ventilated with carbon dioxide gas. Referring now to FIG. 2, when the desired pressure of carbon dioxide gas $P_{ab}$ is reached, the glass wafer 22 is joined together with the silicon substrate 15, and an otherwise standard anodic bonding procedure is performed: the preferred anodic bonding temperature $T_{ab}$ is 430° C.; the preferred anodic bonding voltage is 1500 volts; and the preferred anodic bonding time is approximately 1 hour. Since the anodic bonding is performed at an elevated temperature $T_{ab}$ (e.g. 430° C.), the internal pressure $P_c$ within the gas chamber 12 after cooling (e.g. ambient temperature $T_0$) is approximately half of the bonding pressure $P_{ab}$. In other words, anodic bonding is performed at carbon dioxide over-pressure (i.e. $P_{ab}=P_c\times$the ratio $T_{ab}/T_0$) in order to encapsulate a higher concentration of carbon dioxide gas within the chamber 12. If desired, the four stack wafer assembly (FIG. 1) is then sawed into individual filters 10. The yield attained from this process is typically better than 95%. The success of fusion and anodic bonding ensures very good hermetic seals of the carbon dioxide chambers 12. Thermocycling tests have also been conducted on chambers 12 fabricated in accordance with the above-described process, and the chambers 12 did not reveal any gas leaks.

Figure 3:
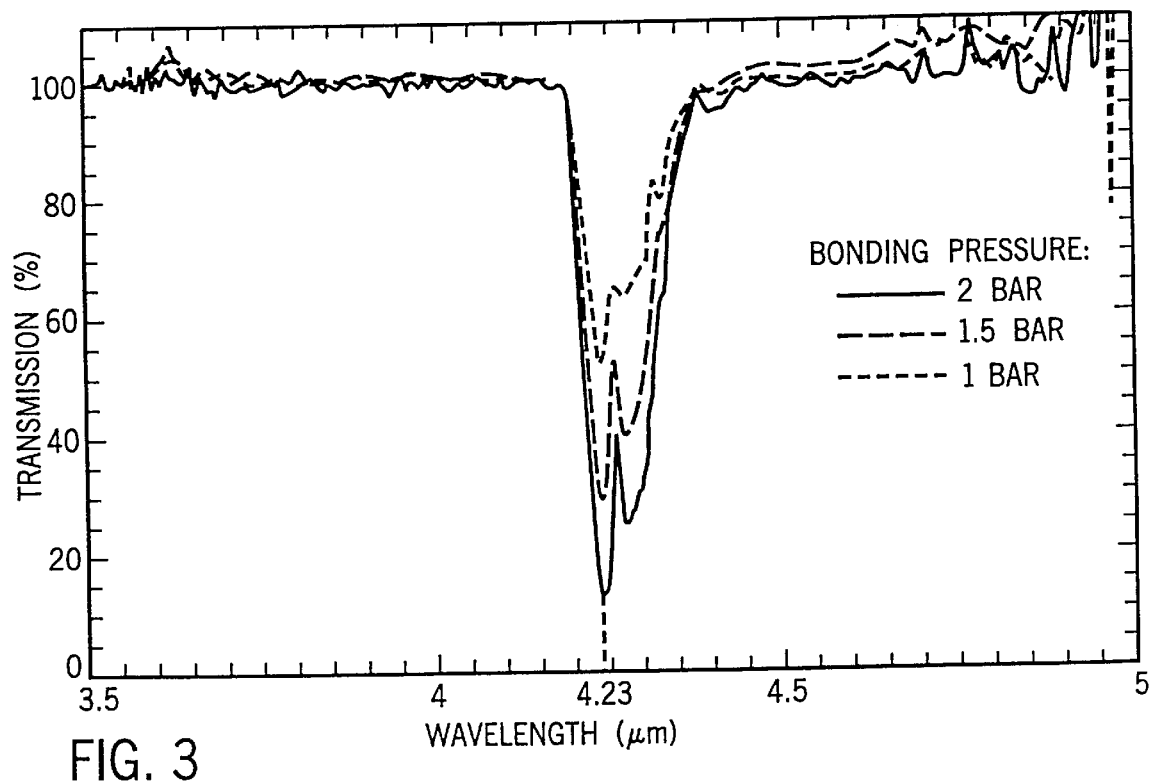
FIG. 3 is a graph illustrating test results of optical transmission through a carbon dioxide filter made in accordance with the invention shown as a function of wavelength for various anodic bonding over-pressures.

FIG. 3 illustrates optical filter characteristics of the filter 10 shown in FIG. 1 in which the anodic bonding pressure $P_{ab}$ is varied. In FIG. 3, the transmission spectrum of the carbon dioxide chamber 12 is plotted versus wavelength, for three different bonding pressures $P_{ab}$ (1, 1.5 and 2 bar). The plot in FIG. 3 confirms the strong absorption characteristics of carbon dioxide at 4.23 μm. As expected, the anodic bonding pressure $P_{ab}$ has a strong effect on the absorption filter. At a pressure of one bar, the maximum absorption is 49%, while at a pressure of 2 bar, the maximum absorption reaches almost 90%.

Figure 4A:
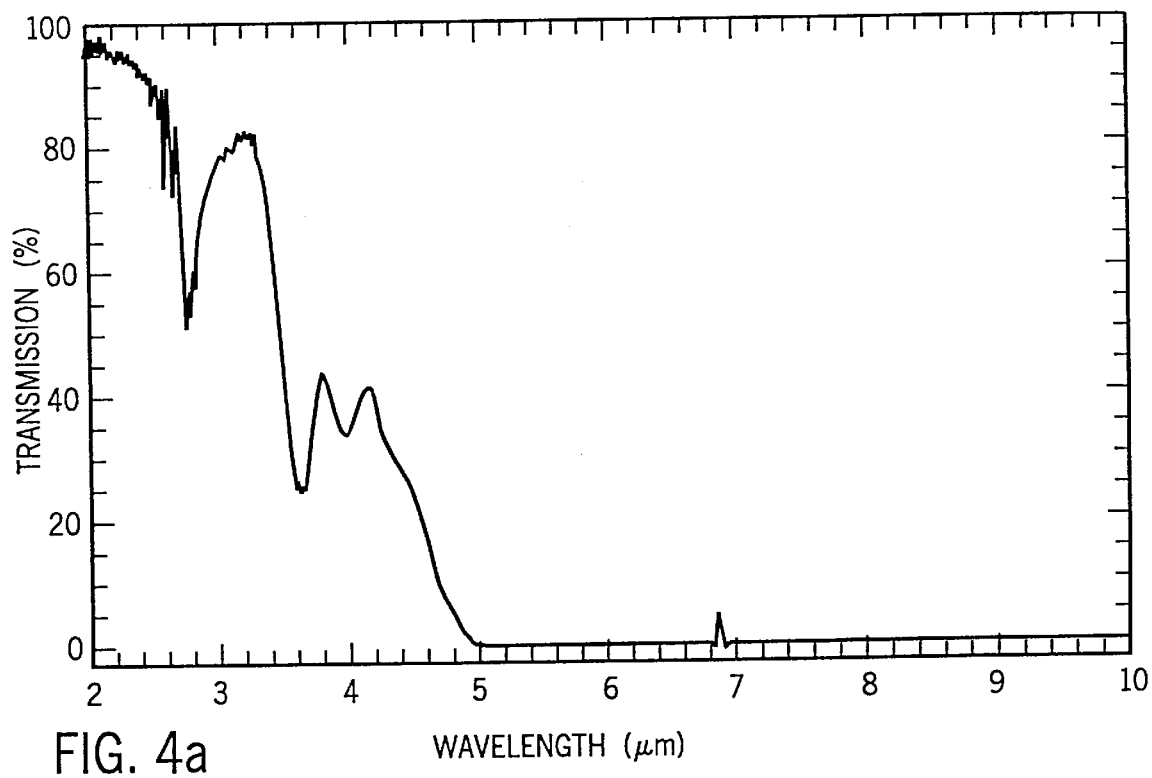
FIGS. 4a and 4b are graphs illustrating optical transmission losses through glass wafers.
Figure 4B:
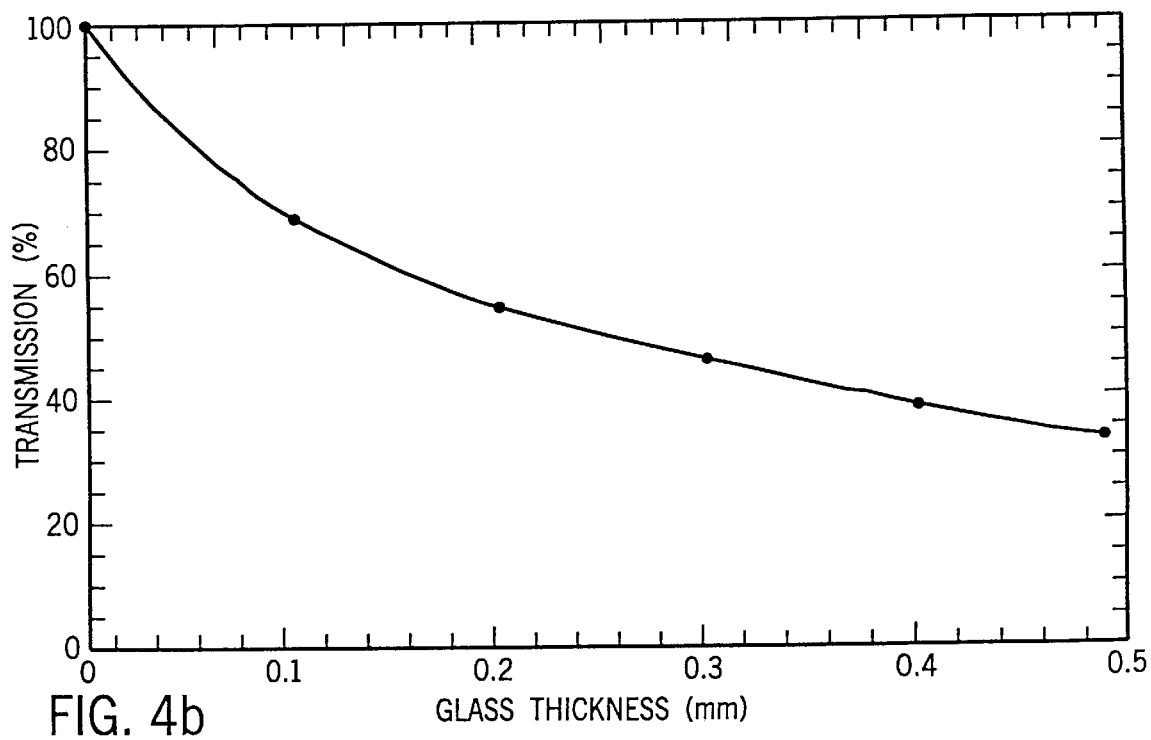

Silicon is essentially transparent to infra-red radiation at 4.23 μm which is wavelength of interest with a carbon dioxide gas filter 10. However, optical transmission losses can occur at λ=4.23 μm as the optical path passes through the glass wafer 22, and also due to reflection at the physical interfaces between dissimilar materials (especially at interference with silicon). FIG. 4a is a plot illustrating the amount of optical transmission loss through a 500 millimeter thick Pyrex 7740 glass wafer versus wavelength λ with air as reference. In FIG. 4a, note that glass absorption is dominant at about 5 μm or larger which means that Pyrex glass cannot be used for these wavelengths. Note also that at a wavelength λ=4.23 μm, a 500 μm thick glass wafer has an optical transmission loss of approximately 60%. To improve optical transmission, it is desirable to reduce the thickness of the glass wafer 22. FIG. 4b illustrates optical transmission losses at λ=4.23 μm for various thicknesses for the glass wafer 22. Note that 70% transmission can be achieved if the glass wafer 22 is thinned to 100 μm. If necessary, thinning can be achieved via etching.

Figure 5:
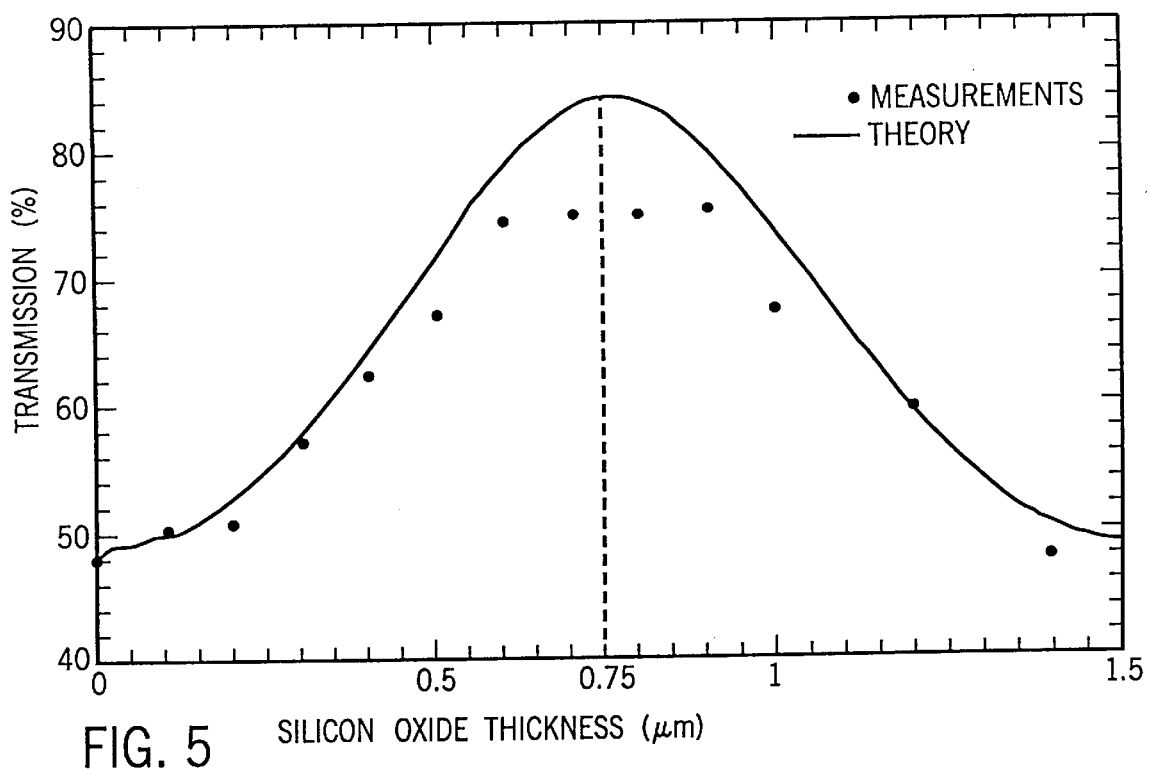
FIG. 5 is a graph illustrating optical transmission losses through a silicon wafer having silicon oxide coatings of various thickness for wavelength λ=4.23 microns.

Due to the large change in the refractive index from air to silicon, there are especially high reflection losses at these interfaces. To minimize these losses, the surfaces of the silicon along the optical path can be coated by anti-reflective coatings. The preferred anti-reflective coating is a silicon dioxide coating because such a coating does not interfere substantially with bonding procedures. FIG. 5 shows the percentage of optical transmission losses at λ=4.23 μm as a function of thickness for a silicon dioxide coating. As shown in FIG. 5, the preferred thickness of silicon dioxide anti-reflective coatings is approximately 0.75 μm. Another suitable anti-reflective coating is silicon nitride. Silicon nitride can be used effectively as an anti-reflective coating, however, the fabrication procedure is more complicated because the silicon nitride coating needs to be patterned so that fusion bonding is not adversely affected. Thus, with a silicon nitride coating, an extra mask and an extra photolithography step are necessary as well as a sensitive alignment step.

Figure 6:
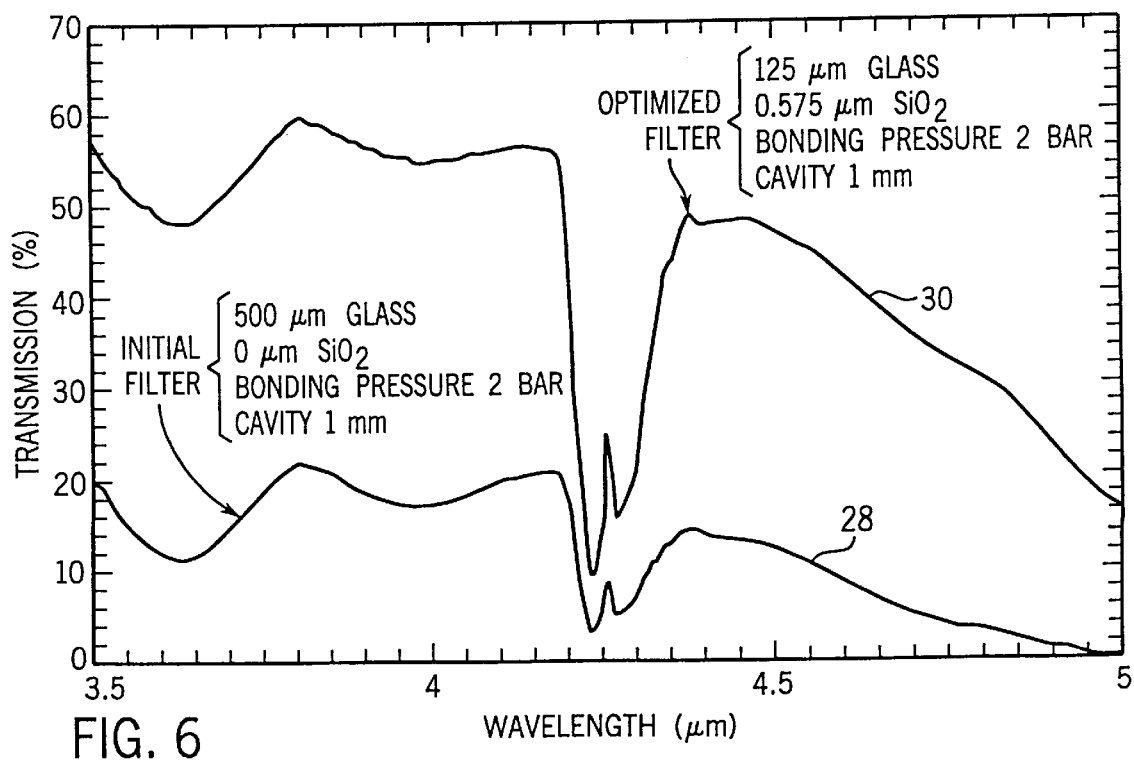
FIG. 6 is a graph illustrating optical transmission losses through the gas-filled chamber illustrated in FIG. 1 provided that a thin glass layer and silicon oxide coatings are used to reduce optical transmission losses.

FIG. 6 compares the performance of an optical gas filter 10 shown in FIG. 1 after the glass wafer 22 is thinned and anti-reflected coatings are used. Curve 28 shows the optical transmission versus wavelength for a carbon dioxide gas filter 10 having a 500 μm glass wafer 22, no anti-reflective coating, a bonding pressure of 2 bar, and a cavity thickness of 1 millimeter. Curve 30 shows optical transmission versus wavelength for a carbon dioxide filter having a 125 μm glass wafer 22, 0.575 micron silicon dioxide anti-reflective layers, a bonding pressure of 2 bar, and a cavity thickness of one millimeter. Note that the performance of the optimized filter (curve 30) is substantially better, thereby improving signal contrast.

FIG. 7 illustrates various alternative embodiments for microfabricating gas-filled chambers 12 using micromachining techniques similar to those described in FIGS. 1–6. In FIG. 7a, the silicon substrate 15 comprises two silicon wafers 16, 18. A hole 12 is dry edged through the second silicon wafer 18. The silicon wafers 16 and 18 are fusion bonded, and then the glass wafer 22 is anodically bonded in a gas-filled anodic bonding environment to capture a concentration of gas within the chamber 12. The embodiment shown in FIG. 7a is similar to that shown in FIG. 1 except the width of the chamber 12 extends for only the length of a single silicon wafer 18. FIGS. 7b and 7c are embodiments similar to that shown in FIG. 7a. In FIG. 7b, the hole 12 etched through the second silicon wafer 18 has sloped walls as is typical with a KOH etch. In FIG. 7c, the walls of the hole 12 are KOH etched from both sides. FIG. 7f shows an embodiment in which the silicon substrate consists of a single silicon wafer into which cavity 12 is etched to form the chamber 12 after anodic bonding of the glass wafer 12 to the silicon wafer 15. In FIG. 7g, the cavity 12 is etched into the glass wafer 22 rather than the silicon wafer 15.

Figure 7A:
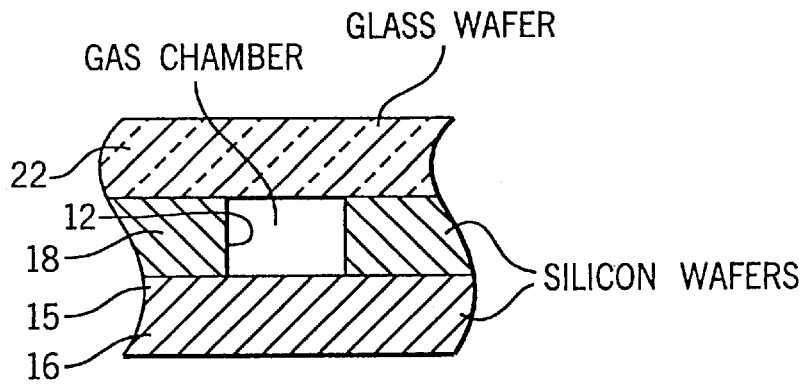
Figure 7B:
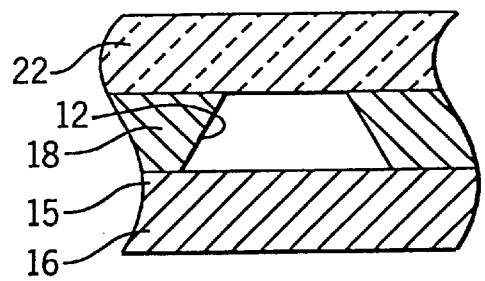
Figure 7C:
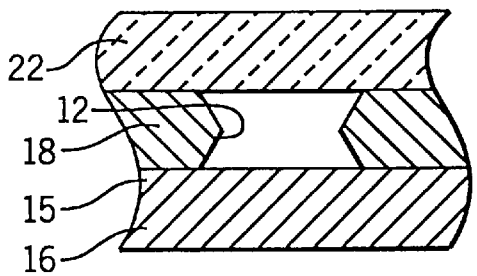
Figure 7D:
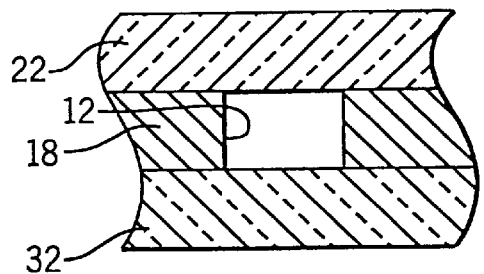
Figure 7E:
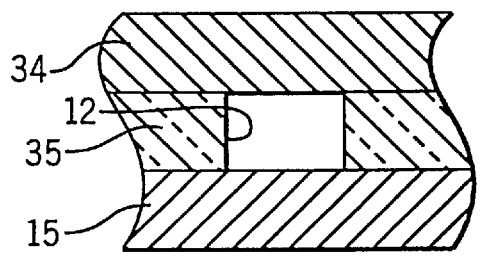
Figure 7F:
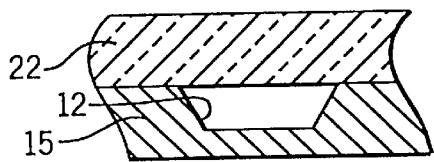
Figure 7G:
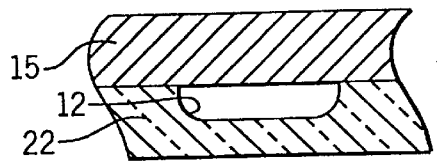

In FIG. 7d, the first silicon substrate 16 is replaced by glass wafer 32. Glass wafer 32 is anodically bonded to the silicon wafer 18 having the hole 12 etched therethrough. In the embodiment shown in FIG. 7d, it is necessary that only one of the anodic bonds (i.e. either glass wafer 22 or glass wafer 32) to be implemented within the gas-filled anodic bonding environment. In FIG. 7e, the hole 12 is etched through a glass wafer 35 rather than a silicon wafer. Also, the glass wafers 22, 32 shown in FIG. 7d are replaced with silicon wafers 34, 15.

Figure 7H:
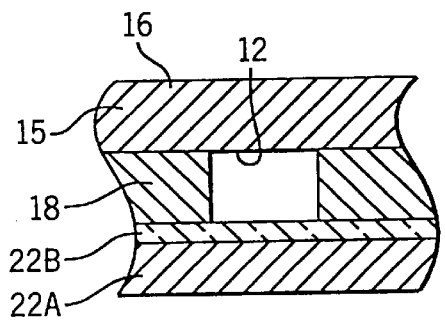
Figure 8A:
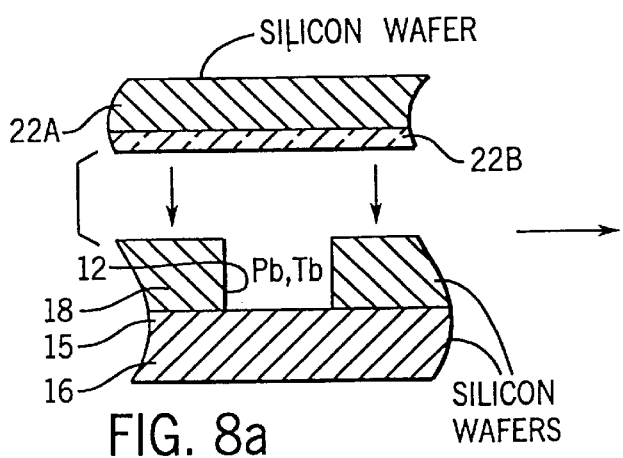
Figure 8B:
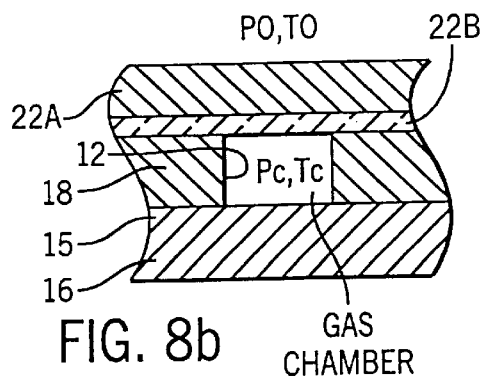

In FIG. 7h, the glass wafer 22 shown in FIG. 7a is replaced with a silicon wafer 22a having a glass coating 22b. In this manner, it is possible to use anodic bonding to bond the silicon substrate 15 with the cavity 12 to the silicon wafer lid 22a. The layer 22b of bondable glass can be deposited on the silicon wafer 22a using liquid glass spin-on techniques, Pyrex sputtering, or some other glass deposition technique. FIG. 8 shows the anodic bonding technique for the embodiment shown in FIG. 7h. Note that anodic bonding occurs in an over-pressured anodic bonding environment as disclosed in detail with respect to FIG. 2, the primary difference being the application of the bondable glass layer 22 on the silicon wafer 22a.

Figure 7I:
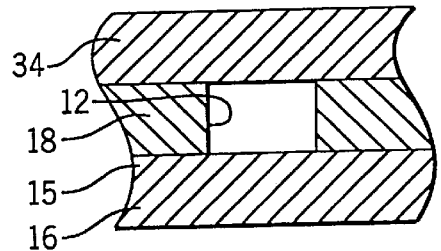

In FIG. 7i, the glass wafer 22 shown in FIG. 7a is replaced with another silicon wafer 34. The silicon wafer 34 is fusion bonded to silicon wafer 18 after an initial bond implemented within a bonding environment containing a gas, such as carbon dioxide gas. The gas (e.g. carbon dioxide) is captured within the chamber 12 during the initial bonding step. Referring to FIG. 9, the fusion bonding technique is now explained in more detail. First, the silicon substrate 15 and silicon wafer lid 34 are chemically prepared in acid. After chemical preparation, the silicon substrate 15 and the wafer lid 34 are aligned in a fixture with a small gap between the bonding surfaces. It is important that the bonding surfaces do not come in contact with one another prematurely. The aligned silicon substrate 15 and silicon wafer lid 34 are then placed in a gas-filled environment having a preselected concentration and pressure at room temperature (i.e. the preselected gas pressure will be the same pressure in the chamber 12 after complete fabrication). The silicon wafer is then pressed against the silicon substrate 15 for initial bonding at room temperature. The initially bonded structure is then heated to strengthen the bond and hermetically seal the gas within the chamber 12. Preferably, heating is accomplished in two steps: first, the microstructure is heated to approximately 400° C. within the bonding machine, and later it is heated in a furnace to a temperature higher than 400° C., such as 1000° C.

FIG. 10 shows various configurations that may be useful for reducing optical transmission losses including various manners of applying anti-reflective coatings. In FIG. 10a, a hole 12 is etched in the glass wafer 35 and two silicon wafers 16, 34 are anodically bonded to the glass wafer 35 to form the gas-filled chamber 12. Silicon dioxide anti-reflective coatings 36 are applied continuously over the silicon wafers 16, 34. The optical path 38 passes through the wafers 34, 16 and the respective anti-reflective coatings 36 as well as the gas-filled chamber 12. In FIG. 10b, the silicon dioxide coatings 36 are replaced with silicon nitride coatings 40 which must be patterned and aligned as to not interrupt the bonding interfaces between the respective wafers 34, 35 and 16. The embodiment in FIG. 10c is similar to that in FIG. 7a except that the glass wafer 22 has been thinned by etching and silicon nitride coatings 40 have been applied to reduce optical transmission losses.

Figure 11A:
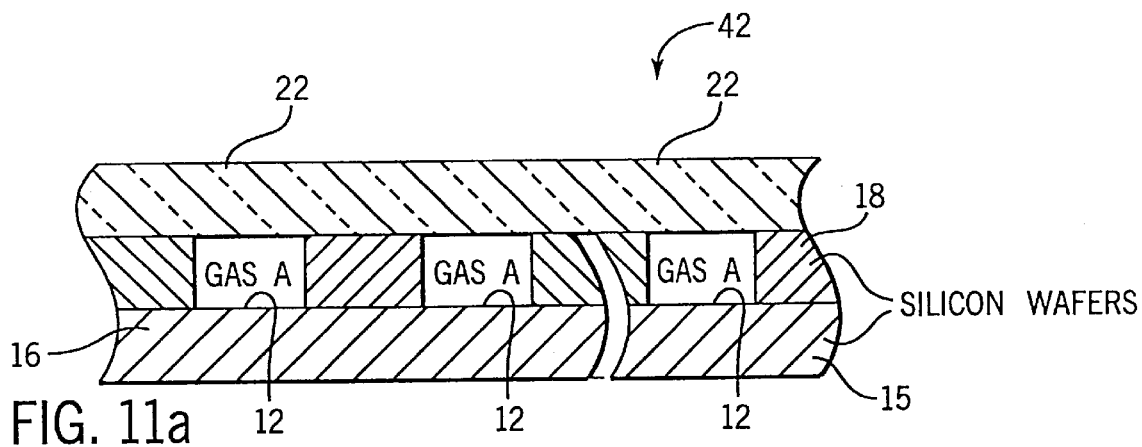
Figure 11B:
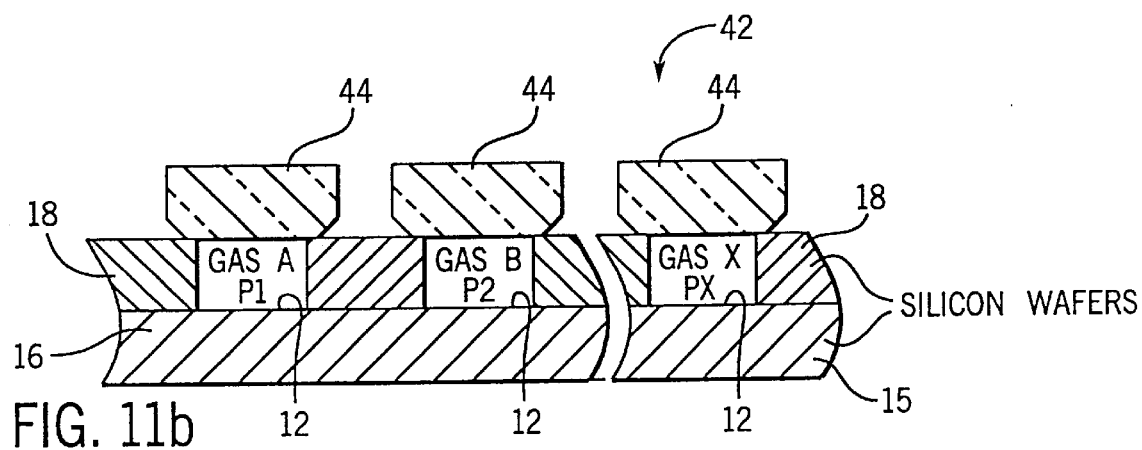
Figure 11C:
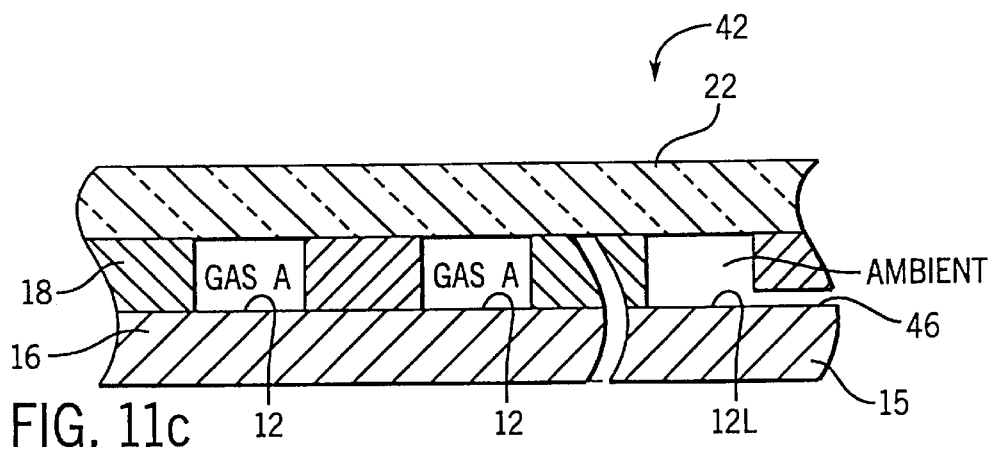

FIG. 11 shows schematic drawings illustrating various embodiments of the invention in which a plurality of chambers 12 are microfabricated onto a single chip assembly 42. In FIG. 11a, each of the chambers 12 is filled with the same gas at the same concentration. In FIG. 11b, each of the chambers 12 is filled with a different gas composition or different gas concentration. Separate glass covers 44 are provided for each of the various gas compositions/concentrations. In FIG. 11c, a conduit 46 is microfabricated into wafer 18 (although the conduit 46 could be microfabricated into any of the wafers 22, 18, 16). The conduit 46 leads from chamber 12L in FIG. 11c to an edge of the chip 42 so that the chamber 12L is open to the outside atmosphere. Thus, the chamber 12L will be filled with e.g. ambient air when the chip assembly 42 is in operation.

Figure 12A:
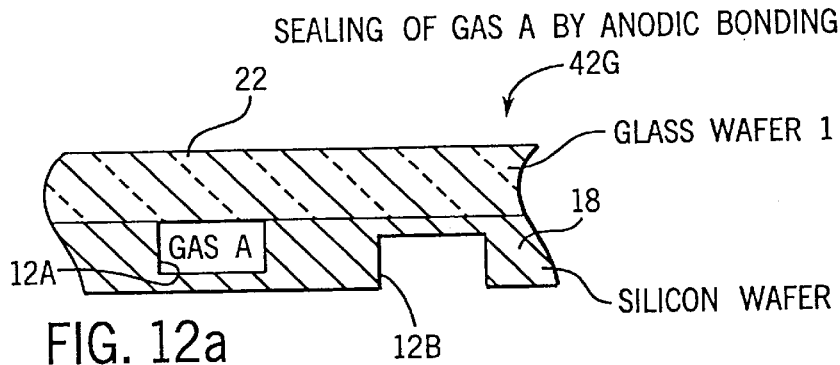
Figure 12B:
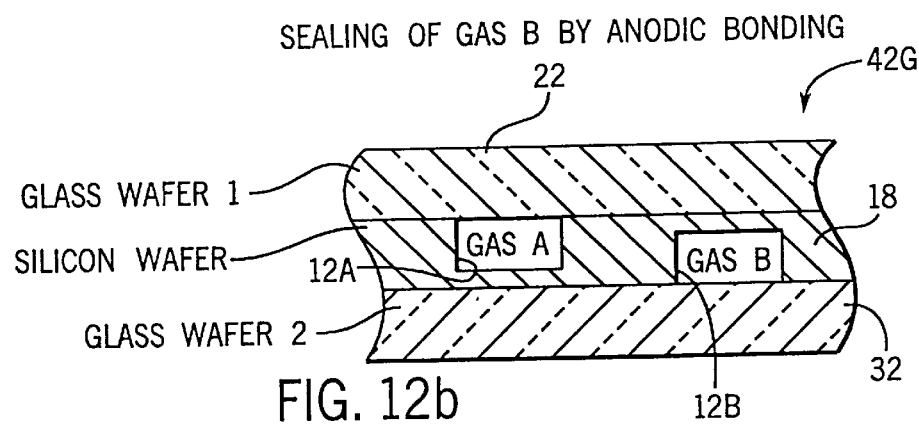

FIG. 12 shows one possible method of microfabricating a single-chip assembly having gas-filled chambers 12a, 12b filled with different gases and/or gas concentrations. First, glass wafer 22 is anodically bonded to silicon wafer 18 to encapsulate gas A within chamber 12a. Then, glass wafer 32 is anodically bonded to the other side of silicon wafer 18 to capture gas B within chamber 12b. The single-chip assembly 42 shown in FIG. 12 is, however, suboptimal because the double use of glass wafers 22, 32 is likely to lead to excessive optical losses.

Figure 13A:
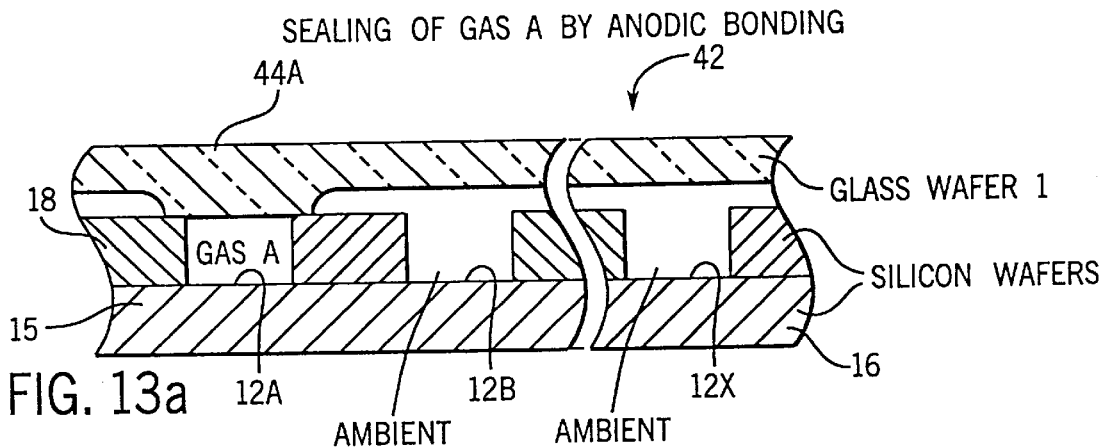
Figure 13B:
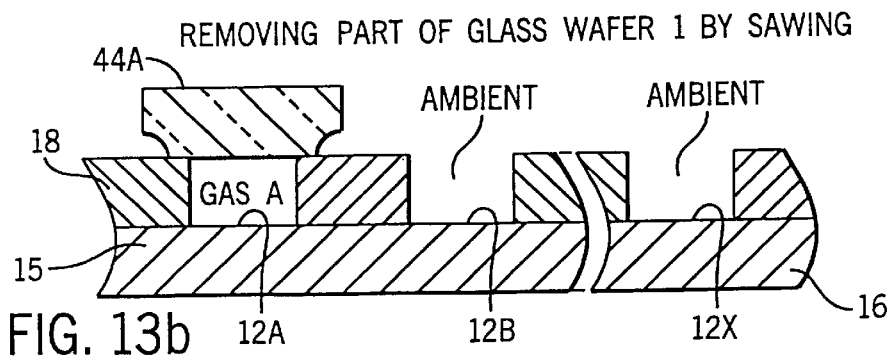

FIG. 13 illustrates the preferred manner of microfabricating an assembly having a plurality of hermetically sealed gas-filled chambers 12a, 12b, 12x on a single chip 42. FIG. 13a shows glass wafer 44a which is anodically bonded to the silicon substrate while located in an anodic bonding environment containing a selected concentration of gas A. The glass wafer 44a has been etched so that portions of the glass wafer 44a not covering cavities 12a selected to contain gas A or the respective surrounding bonding surfaces for the selected cavities 12a do not contact the silicon substrate 15 when the glass wafer 44a is aligned with the silicon substrate 15 for anodic bonding in the environment filled with gas A. After anodic bonding, the glass wafer 44a is sawed to remove the portion of the glass wafer 44a which was previously etched away and was not covering the cavities 12a selected to contain gas A (see FIG. 13b). FIG. 13c shows the use of a second glass wafer 44b which again has portions etched away. The second glass wafer 44b is anodically bonded to the assembly while being located in an anodic bonding environment containing gas B (see FIG. 13c). After anodic bonding of the second glass wafer 44b to the silicon substrate 15, gas B is encapsulated within the respective hermetically sealed chambers 12b, and again the excess portions of the glass wafer 44b are removed by sawing. This procedure can continue for as many gas environments as desired (see FIG. 13e).

Figure 14A:
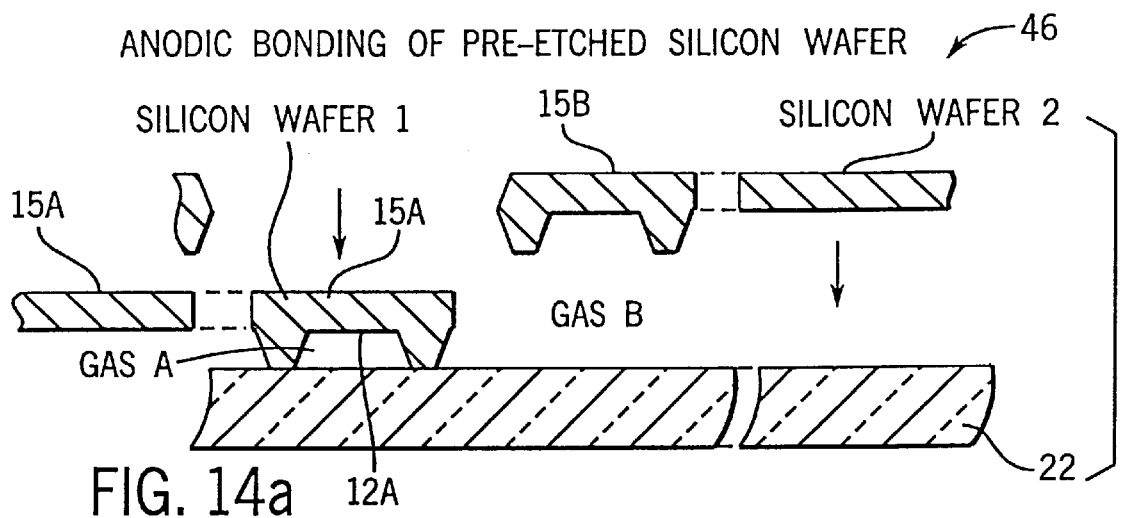
Figure 14B:
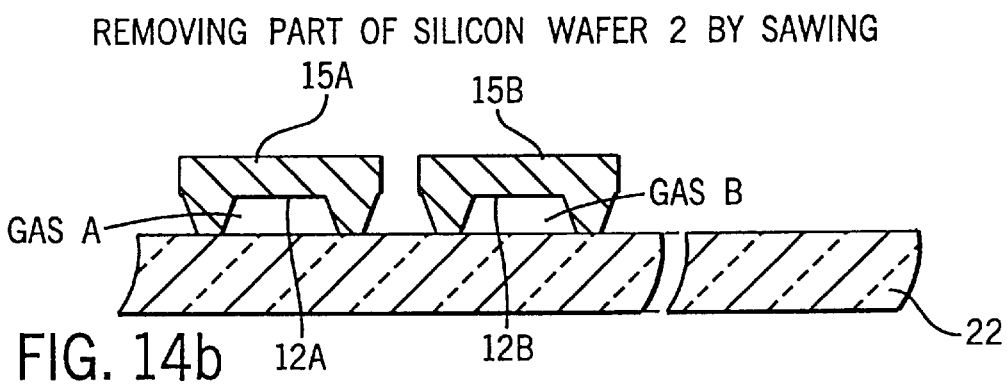
Figure 14C:
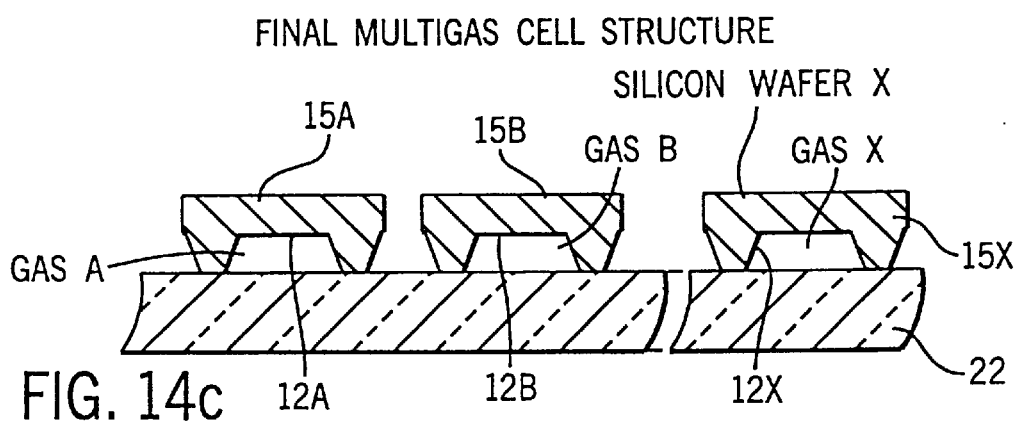

FIG. 14 shows yet another alternative fabrication method for microfabricating a plurality of hermetically sealed gas-filled chambers 12a, 12b, 12x on a single chip 46. In FIG. 14a, a cavity 12a is etched in silicon substrate 15a which is fabricated from a single etched silicon wafer. The pre-etched silicon wafer 15a is anodically bonded to the glass wafer 22 within an anodic bonding environment containing gas A, thereby capturing gas A within the chamber 12a. After anodic bonding of silicon wafer 15a to the glass wafer 22, the excess portion of the silicon wafer 15a is sawed with a dicing blade to remove the excess portion. This process can be repeated for multiple gas environments as shown in FIGS. 14b and 14c.

Figure 15A:
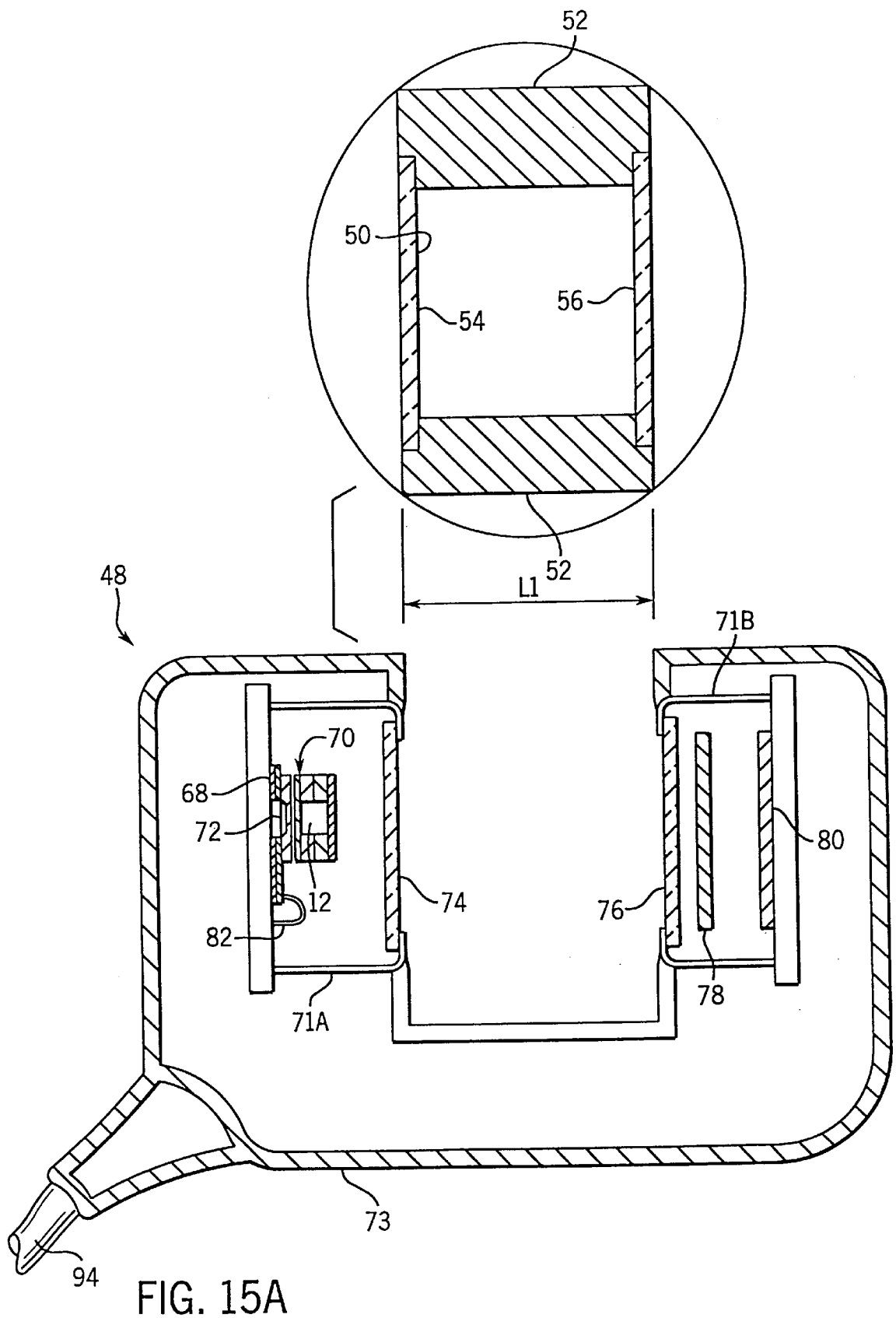
FIG. 15A shows a transducer using a gas-filled chamber microfabricated in accordance with the invention.
Figure 15B:
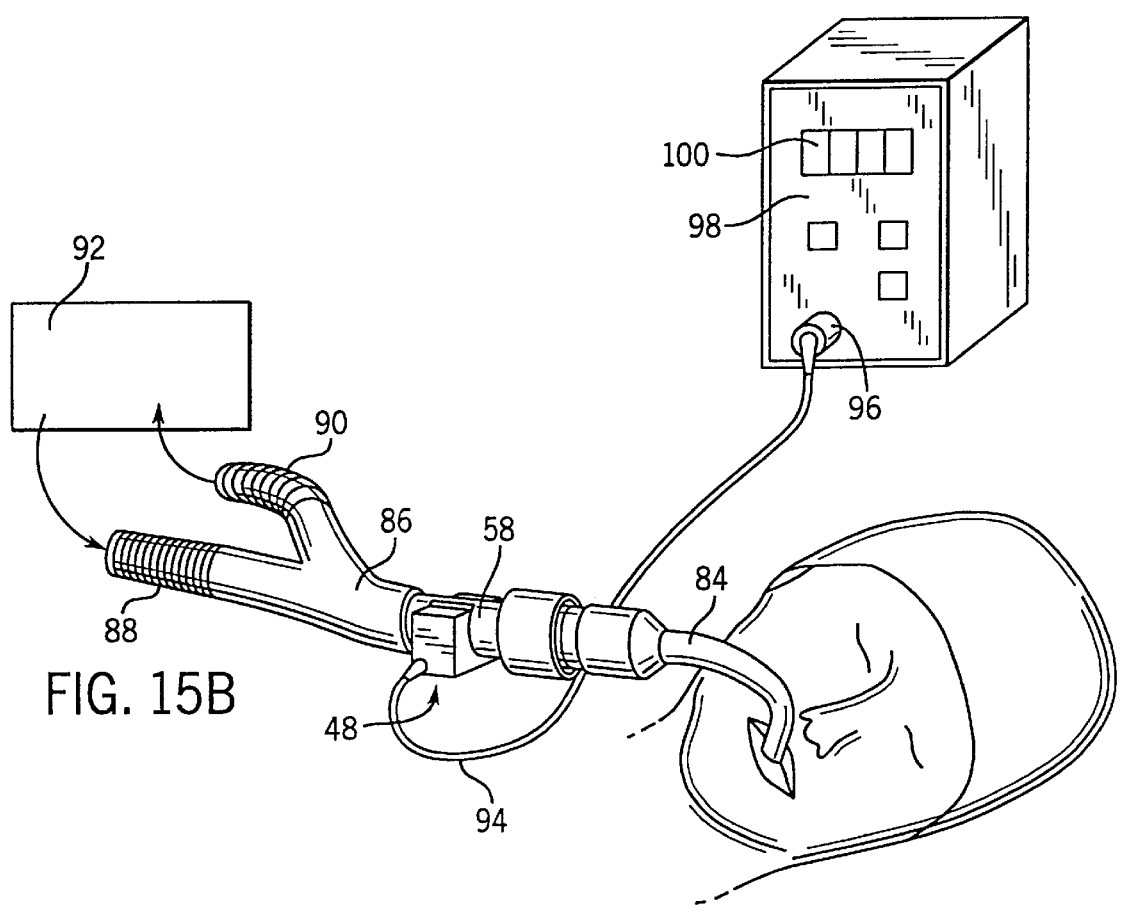
FIG. 15B shows the transducer of FIG. 15A connected to a breathing circuit of a patient.

A typical application for an optical filter 10 as disclosed thus far is shown in FIGS. 15A and 15B. FIG. 15A shows a transducer 48 and a detachable a gas sample volume 50. If the transducer 48 is used as a mainstream transducer, the walls 52 and the windows 54, 56 of the gas sample volume 50 are parts of a connector 58 (FIG. 15A) which is part of the patient's breathing circuit, but which can be detached from the transducer 48. The connector 58 (FIG. 15A) should be disposable, or should be able to be easily sterilized. Therefore, it is an important characteristic that the connector 58 be detachable from the transducer 48. The transducer 48 includes an infra-red radiation source chip 68 and a carbon dioxide filter chip 70 containing a carbon dioxide-filled chamber 12. The chips 68/70 can be held by a ceramic holder, or can be integrally fabricated as disclosed in FIGS. 18 and 19. The IR source chip 68 and the gas filter chip 70 are mounted to casing 71a which in turn is mounted to transducer housing 73. In a similar manner, casing 71b holds the components on the other side of the transducer 48.

The IR source chip 68 includes a plurality of filaments 72 which emit radiation through the carbon dioxide filter 70, through window 74, through sample gas volume 50, through window 76, through IR band pass filter 78 and onto infra-red detector 80. The glass windows 70, 76 can be of glass, ceramic, silicon or other thin material transparent to infra-red radiation. If necessary, an anti-reflective film should be used to reduce reflective optical transmission losses. Typically, the IR source 72 includes an array of 20 to 50 microfilaments. As described in the above incorporated U.S. Pat. No. 5,668,376, the IR radiation source 68 is fabricated from a pure silicon substrate. Briefly, a recess is etched in the substrate in the region of the microfilaments, i.e. in the region which emits radiation. The filaments are typically made of polycrystalline silicon which is doped to become conducting and protected by a silicon nitride coating, but they may be made by other materials suitable for thin film technology such as metal (e.g. tungsten) etc. The filaments are spaced away from the bottom surface of the recess, such that the microfilaments have a small thermal capacity and thus a short thermal time constant. The volume of an individual microfilament is at most 200,000 $\mu m^3$, preferably at most about 50,000 $\mu m^3$, and typically of the order 2,000 to 20,000 $\mu m^3$; and the thermal time constant of the microfilaments is at most about 50 milliseconds, preferably at most about 10 milliseconds, typically of the order 0.5 to 5 milliseconds. Thus, a single microfilament has a typical thickness of the order of 0.5 to 5 $\mu m$, a width of the order 5 to 100 $\mu m$, and a length of the order 50 $\mu m$ to 3 millimeters. The distance of the filament from the bottom of the recess is generally of the order 10 to 1,000 $\mu m$, typically of the order 50 to 300 $\mu m$. The filaments of the IR source 72 are electrically connected to metal electrodes on the IR chip which act as terminals to the rest of the electrical system. In FIG. 15A, electricity is supplied to IR chip 72 via wire 82.

FIG. 15B shows a patient's breathing circuit. Transducer 48 and connector 58 are connected between the patient's incubation tube 84 and the Y-piece 86. The Y-piece connects the input hoses 88, 90 of device 92 which maintains breathing. The transducer 48 is connected electronically via line 94 and connector 96 to the patient monitor 98, where the signal is processed. The patient monitor 98 includes a display 100 which shows the concentration of the gas being measured by the transducer 48 as a function of time, i.e. the breathing curve or the concentration values of inhalation and exhalation.

The described infra-red analyzer is primarily intended to be used in the mainstream as a carbon dioxide transducer, but using the same principal it would also be possible to measure other gases or liquids which absorb radiation. In anesthesia, it is primarily a question of laughing gas or anesthesia gas. It is quite clear that there are also other gases that can be measured in other applications.

Figure 16:
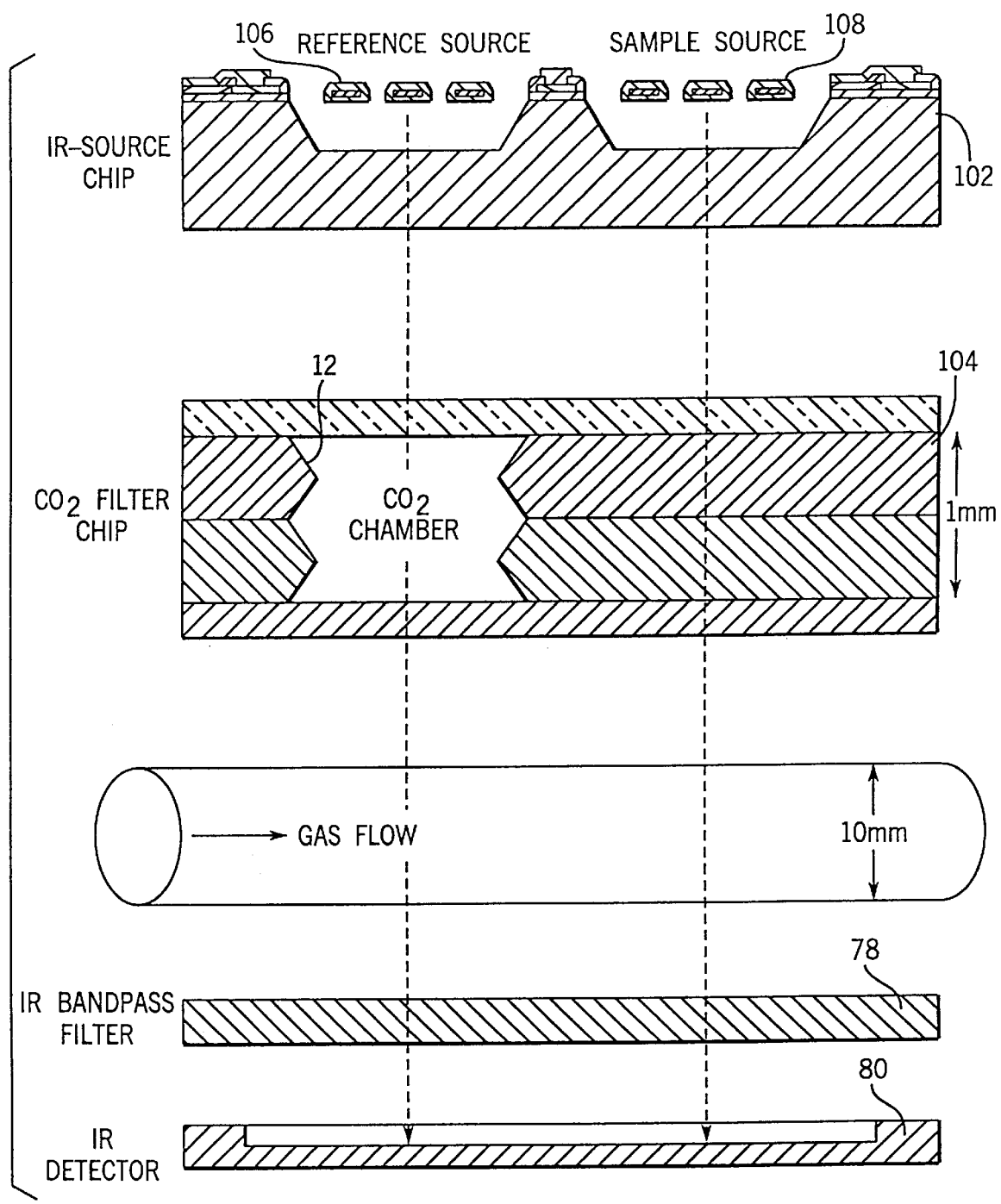
FIG. 16 is a schematic view illustrating a microfabricated carbon dioxide filter chip having a carbon dioxide chamber used in connection with an infra-red radiation source chip in which the reference radiation source is laterally disposed from the sampling radiation source on the same chip.

FIG. 16 illustrates a particularly useful configuration for an IR sensor which has been developed as a result of the ability to fabricate a chip 104 having a plurality of hermetically sealed gas-filled chambers 12. FIG. 15 illustrates a microfabricated carbon dioxide filter chip 104 used in connection with an infra-red radiation source chip 102 in which a reference radiation source 106 is laterally displaced from the sampling radiation source 108 on the same chip 102. FIG. 18 shows a top view of the IR source chip 102. Note that there are two diagonally disposed reference sources 106a, 106b and two diagonally disposed sampling sources 108a, 108b. The carbon dioxide filter chip 104 should include a separate carbon dioxide-filled chamber 12 for each reference source 106a, 106b. Aluminum bonding pads 110, 112, 114, 116 and 118 are provided on the IR source chip 102 and serve as electrodes for the respective radiation sources 106a, 106b, 108a, 108b. Referring now to both FIGS. 17 and 18, the IR sources 106a, 106b, 108a, 108b consist of silicon nitride 120 encapsulated phosphorous doped polysilicon filaments suspended across a respective KOH etched cavity. The filament length is approximately 1 millimeter which is a compromise between mechanical strength and thermal characteristics of the IR source. Shorter filaments would mean a higher mechanical strength, but would provide a less even temperature distribution over the filament area. In this application, the IR sources 106a, 106b, 108a, 108b are switched diagonally in pairs between the sampling beam and the referencing beam in relatively fast modulation (t<ten milliseconds), therefore preferred cavity depth is between 100 and 300 $\mu m$.

Figure 17A:
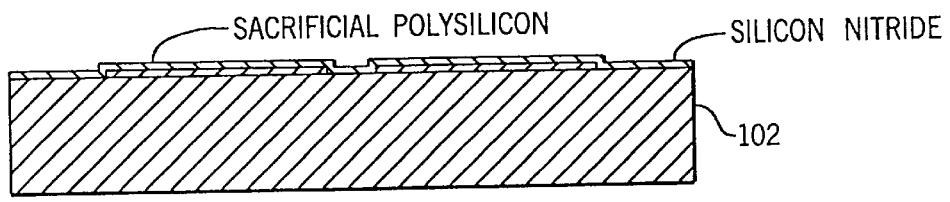
Figure 17B:
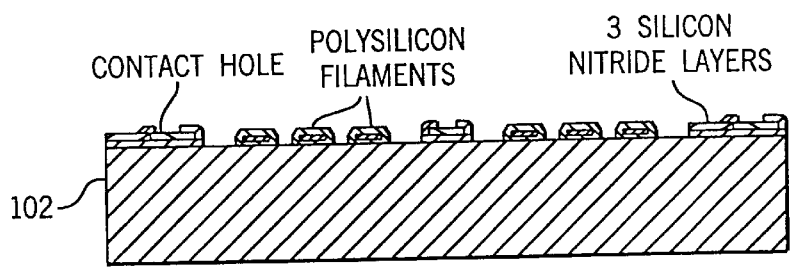
Figure 17C:
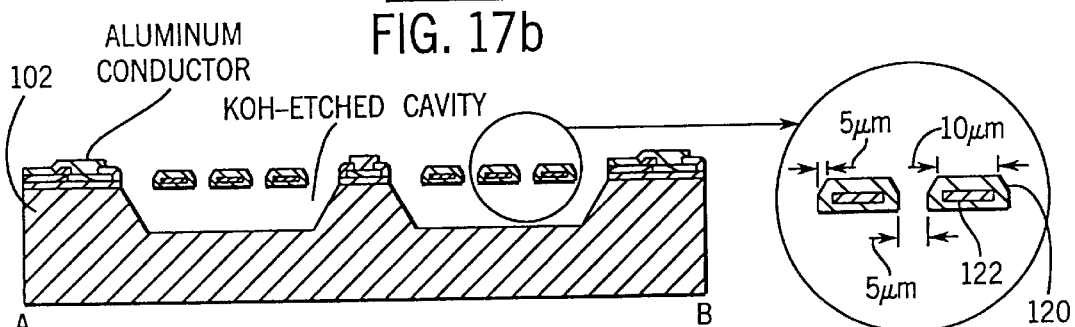
Figure 18:
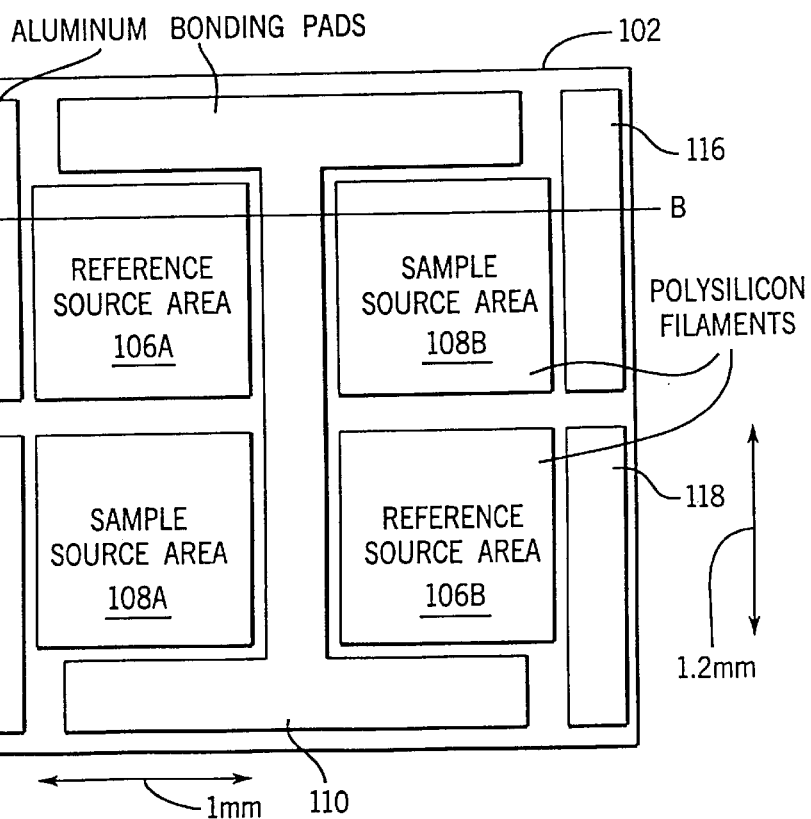
FIG. 18 is a top view of the chip shown in FIG. 16 which includes laterally disposed infra-red radiation sources.

The fabrication process is shown schematically in FIG. 17. A pure silicon substrate 102 with a 1000 angstrom thick sacrificial polysilicon layer in the areas of the etched cavities underneath the filaments is provided to begin fabrication. The sacrificial polysilicon is photolithographically patterned and dry etched to define the cavity areas in which the filaments will be located. This is followed by a 1 $\mu m$ stress-free silicon nitride layer and then a 0.5 $\mu m$ polysilicon deposition. Phosphorous ion implantation, photolithography, and polysilicon dry etching are implemented to form the doped polysilicon filament which is then followed by a second 0.5 $\mu m$ stress-free silicon nitride deposition. Activation of the dopants in the polysilicon filaments for one hour at 1000° C. gives the sheet resistance of about 25 ohms per square. Photolithography and a dry nitride etch open up the contact holes and a thin (1000 angstroms) stress-free silicon nitride is deposited to protect the contact holes during the KOH etch. The openings between the filaments, down to the sacrificial polysilicon layer, are then photolithographically patterned and dry etched. KOH etching results in lateral etching of the sacrificial polysilicon and vertical etching of the silicon substrate which forms cavities having a depth of preferably about 200 $\mu m$ beneath the filaments. Finally, the top silicon nitride layer is removed by a dry etch, and this is followed by deposition of 1.5 μm thick aluminum layer patterned to form the metal bonding pads 110, 112, 114, 116 and 118. Dicing by sawing results in the IR source chip 102 shown in FIG. 18. The IR source chip shown in FIG. 18 can be implemented in an operational transducer as a separate component from the carbon dioxide filter chip 104 as shown in FIG. 16, or it can form a part of an integral single-chip assembly integrating both the infra-red radiation sources and the respective carbon dioxide filters.

Figure 19A:
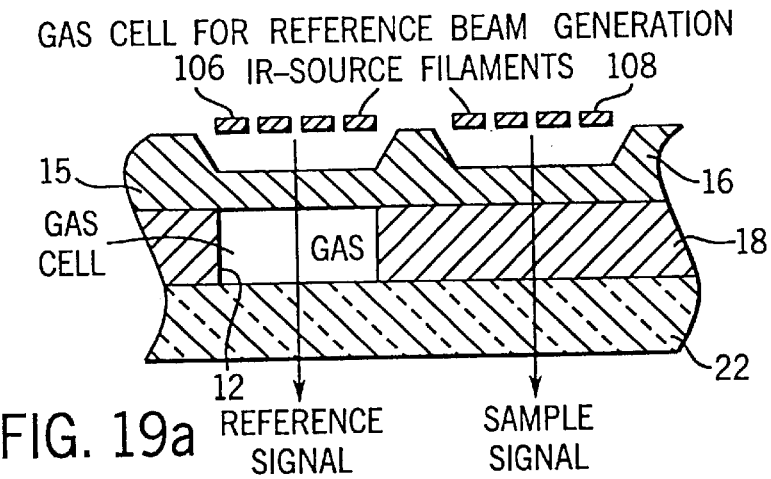
Figure 19B:
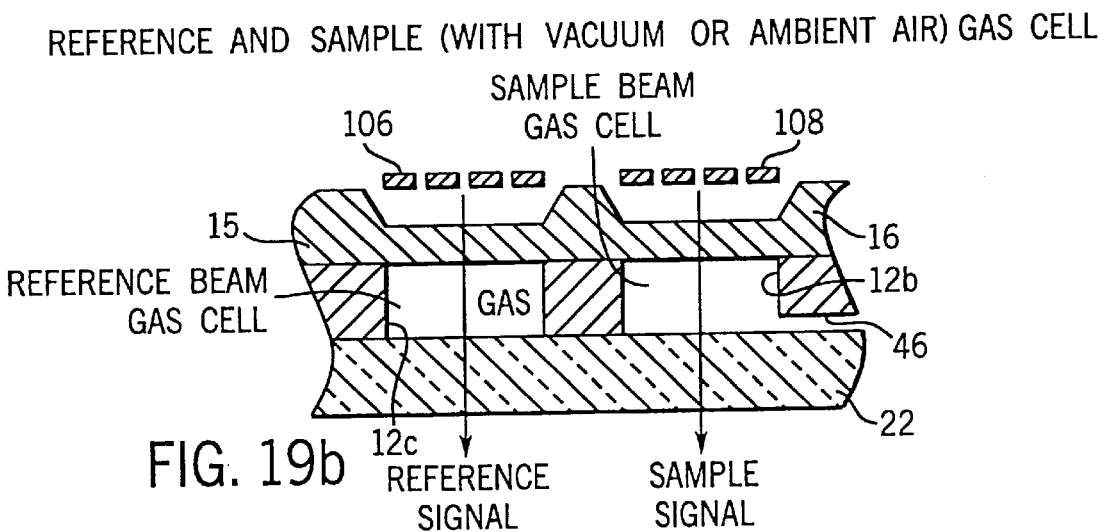
Figure 19C:
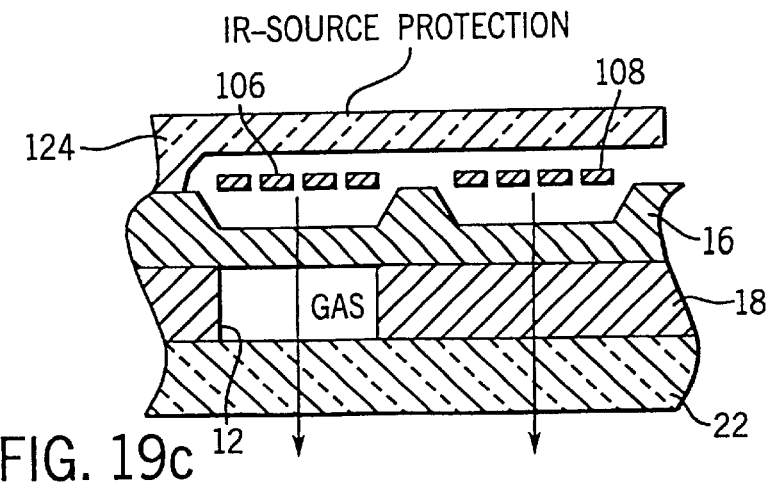

FIGS. 19 and 20 illustrate various microfabricated assembly configurations integrating IR sources and optical gas filters on a single chip. The IR sources 106, 108 are fabricated on the first silicon wafer 16 and the gas-filled chamber 12 is etched in the second silicon wafer 18. Preferably, as described earlier with respect to FIG. 7, the silicon wafers 16, 18 are fusion bonded to form the integral silicon substrate 15 having the cavity 12 and also the IR sources 106, 108 (IR sources as prefabricated on silicon wafer 16). The glass wafer 22 is then anodically bonded to the silicon substrate 15 within a gas-filled anodic bonding environment to capture gas within the chamber 12. FIG. 19a shows an embodiment in which the reference signal from reference IR source 106 passes through gas-filled chamber 12, whereas the sampling signal from the sampling source 108 passes through the silicon substrate 15. In FIG. 19b, the sampling signal from the sampling source 108 passes through chamber 12b which contains a leak 46, thereby causing the chamber 12b to be filled with ambient air. The embodiment shown in FIG. 19c is similar to the embodiment shown in FIG. 19c except the chip assembly includes a protective glass cover 124 to protect the IR filaments 106, 108 from mechanical damage. In FIG. 19d, the IR filaments 106, 108 are vacuum-sealed within the glass cover 124, thereby further protecting the filaments 106, 108 from other types of environmental irritants. Note that the protective cover 124 in FIG. 19d is preferably applied in a separate anodic bonding process than the glass wafer 22. Also note that the IR filaments 106, 108 are located external to the gas-filled chamber 12 in FIGS. 19a–19d. By contrast, FIG. 19e shows an embodiment in which the IR filaments 106, 108 are located within the chambers 12a, 12b. Chamber 12a is gas-filled, such as with carbon dioxide gas, so that the reference signal from the reference source 106 passes through the gas in the chamber 12a. On the other hand, chamber 12b includes a leak 46. Thus, the sample signal from the sampling IR source 108 passes through ambient air rather than a filtering gas.

FIG. 20 illustrates two embodiments in which a single-chip assembly including a plurality of IR sources can be integrated on a single chip having a plurality of hermetically sealed chambers 12a, 12b, 12x wherein each chamber 12a, 12b, 12x contains a different gas composition and/or concentration. In many ways, the method of fabrication is similar to that disclosed with respect to FIG. 13. In FIG. 20a, the first silicon wafer 16 is prefabricated to contain IR sources 150a, 150b and 150x before fusion bonding to the second silicon substrate 18 and the subsequent sequential anodic bondings in gas A environment for glass cover 44a, in gas B environment for glass cover 44b, and in gas X environment for glass cover 44x, etc. As is evident from the drawing in FIG. 20a, the IR source filaments 150a, 150b and 150x are external to the respective gas-filled chamber 12a, 12b, 12x in the single-chip assembly shown in FIG. 20a. In FIG. 20b, the IR source filaments 150a, 150b and 150x are located within the respective gas-filled chambers 12a, 12b, 12x. In the single-chip assembly shown in FIG. 20b, the second silicon wafer 16 is prefabricated to include IR filaments 150a, 150b, 150x as well as the respective hole 12a, 12b, 12x for the respective gas-filled chamber. The first and second silicon wafer 16, 18 are then fusion bonded before sequential anodic bonding of glass cover 44a in a gas A environment, glass cover 44b in a gas B environment, and glass cover 44x in a gas X environment.

The invention has been described with respect to various preferred embodiments of implementing the invention. It is apparent that the invention may be implemented in modified form to microfabricate essentially equivalent structures. The following claims should be interpreted to include such modifications and equivalents.

We claim:

1. A method of microfabricating a hermetically sealed gas-filled chamber which contains a gas having a preselected concentration such that the pressure within the chamber is equal to a preselected value $P_c$ when the temperature of the chamber is at a preselected temperature $T_0$, the gas-filled chamber being microfabricated from a silicon substrate comprising one or more silicon wafers, and a glass wafer bonded to the silicon substrate such that a gas-filled cavity is located adjacent the interface between the silicon substrate and the glass wafer, the method of microfabricating the gas-filled chamber comprising:

etching a cavity in the silicon substrate, the cavity being adjacent and surrounded by an anodic bonding surface on the silicon substrate;

placing the silicon substrate with the etched cavity within a gas-filled anodic bonding environment, the gas-filled anodic bonding environment containing a concentration of gas substantially maintained at an anodic bonding temperature $T_{ab}$ and an anodic bonding pressure $P_{ab}$, wherein said bonding pressure $P_{ab}$ is substantially equal to $P_{ab}=P_c(T_{ab}/T_0)$ where $T_{ab}$ and $T_0$ are absolute temperature values and $P_{ab}$ and $P_c$ are absolute pressure values and $P_c$ is the preselected pressure value within the chamber when the chamber is at the preselected temperature $T_0$; and anodic bonding the glass wafer to the anodic bonding surface on the silicon substrate while the silicon substrate with the etched cavity is located within the gas-filled anodic bonding environment at temperature $T_{ab}$ and pressure $P_{ab}$, the anodic bonding in the gas-filled anodic bonding environment being implemented by aligning the glass wafer with the bonding surface of the silicon substrate to form a bonding interface between the glass wafer and the silicon substrate and contemporaneously capturing gas from the gas-filled anodic bonding environment within the cavity, and thereafter applying a bonding voltage across the bonding interface between the glass wafer and the silicon substrate while the glass wafer and the silicon substrate are aligned for bonding within the gas-filled anodic bonding environment to bond the interface and hermetically seal the selected concentration of gas therein.

2. A method of microfabricating a hermetically sealed gas-filled chamber as recited in claim 1 wherein said anodic bonding pressure $P_{ab}$ is substantially greater than the preselected value $P_c$ for the pressure within the chamber when the temperature of the chamber is at or near the preselected temperature $T_0$.

3. A method of microfabricating a hermetically sealed gas-filled chamber as recited in claim 1 wherein the silicon substrate containing the etched cavity comprises a first silicon wafer and a second silicon wafer which are microfabricated in accordance with the following steps:

etching a hole through the first silicon wafer, the anodic bonding surface on the silicon substrate being present on the first silicon wafer and the etched hole through the first silicon wafer being adjacent and surrounded by the anodic bonding surface;

aligning the first silicon wafer with the second silicon wafer so that the anodic bonding surface faces away from the second silicon wafer, the aligned combination of the first silicon wafer with the etched hole and the second silicon wafer thereby forming the cavity in the silicon substrate for the gas-filled chamber; and fusion bonding the first and second silicon wafers to form the integral silicon substrate by placing the combination of the first silicon wafer and the aligned second silicon wafer in an environment having a temperature $T_{fb}$ sufficient to induce fusion bonding of the silicon wafers for a sufficient amount of time to strengthen and hermetically seal the bond at the interface between the silicon wafers.

4. A method of microfabricating a hermetically sealed gas-filled chamber as recited in claim 3 wherein fusion bonding of the first silicon wafer and the aligned second silicon wafer is accomplished before anodic bonding of the glass wafer to the integral silicon substrate having the cavity.

5. A method of microfabricating a hermetically sealed gas-filled chamber as recited in claim 1 wherein the integral silicon substrate with the etched cavity is made from a first silicon wafer, a second silicon wafer, and a third silicon wafer which are microfabricated in accordance with the following steps:

etching a hole through the first silicon wafer, the anodic bonding surface of the integral silicon substrate being located on the first silicon wafer and the etched hole through the first silicon wafer being adjacent and surrounded by the anodic bonding surface;

etching a hole through the second silicon wafer that is commensurate with the hole etched through the first silicon wafer;

aligning the second silicon wafer with an etched hole with the third silicon wafer and aligning the first silicon wafer with an etched hole with the second silicon wafer so that the anodic bonding surface on the first silicon wafer faces away from the second silicon wafer, the aligned combination of the first silicon wafer with an etched hole, the second silicon wafer with an etched hole and the third silicon wafer thereby forming a cavity for the gas-filled chamber in the integral silicon substrate; and fusion bonding the aligned first, second and third silicon wafers by placing the aligned silicon wafers in an environment having a temperature $T_{fb}$ sufficient to induce fusion bonding of the aligned silicon wafers for a sufficient amount of time to strengthen and hermetically seal the bonds at the interfaces between the silicon wafers.

6. A method of microfabricating a hermetically sealed gas-filled chamber as recited in claim 5 wherein the first and second silicon wafers are bonded together using fusion bonding before the combination of the bonded first and second silicon wafers are fusion bonded to the third silicon wafer.

7. A method of microfabricating a hermetically sealed gas-filled chamber as recited in claim 1 wherein the silicon substrate with the etched cavity is made by etching a single silicon wafer.

8. A method of microfabricating a hermetically sealed gas-filled chamber as recited in claim 1 wherein the recited glass wafer is a first glass wafer, the cavity etched in the silicon substrate is a hole passing through the silicon substrate, and the method further comprises the step of anodic bonding a second glass wafer to the silicon substrate on the opposite side of the silicon substrate to which the first glass wafer is anodically bonded, the second glass wafer being bonded to the silicon substrate before the first glass wafer is bonded to the silicon substrate in the gas-filled anodic bonding environment.

9. A method of microfabricating a hermetically sealed gas-filled chamber as recited in claim 1 wherein the gas-filled chamber is filled with carbon dioxide gas.

10. A method of microfabricating a hermetically sealed gas-filled chamber as recited in claim 9 wherein the gas-filled anodic bonding environment contains carbon dioxide gas having an anodic bonding pressure $P_{ab}$ which is greater than atmospheric pressure.

11. A method of microfabricating a hermetically sealed gas-filled chamber as recited in claim 1 wherein the gas-filled chamber is designed to be used as an optical filter and an optical path passes through the glass wafer, the gas-filled chamber, and the silicon substrate, and the method further comprises the step of:

applying an anti-reflective coating on the silicon substrate at the interface between the silicon substrate and the gas-filled chamber along the optical path.

12. A method of microfabricating a hermetically sealed gas-filled chamber as recited in claim 11 further comprising the step of applying another anti-reflective coating on the side of the silicon substrate opposite the chamber also within the optical path.

13. A method of microfabricating a hermetically sealed gas-filled chamber as recited in claim 11 further comprising the step of applying an anti-reflective coating along the interface between the glass wafer and the gas-filled chamber along the optical path.

14. A method of microfabricating a hermetically sealed gas-filled chamber as recited in claim 11 further comprising the step of applying an anti-reflective coating on the glass wafer along the optical path on the side of the glass wafer opposite the gas-filled chamber.

15. A method of microfabricating a hermetically sealed gas-filled chamber as recited in claim 1 further comprising the step of applying an anti-reflective coating on at least one of the wafers along an optical path for infra-red radiation passing through the chamber.

16. A method as recited in claim 15 wherein the anti-reflective coating is a silicon oxide coating.

17. A method as recited in claim 15 wherein the anti-reflective coating is a silicon nitride coating.

18. A method of microfabricating a hermetically sealed gas-filled chamber as recited in claim 1 wherein the hermetically sealed gas-filled chamber is integral with an infra-red radiation source which is microfabricated on the same chip as the hermetically sealed gas-filled chamber.

19. A method of microfabricating a hermetically sealed gas-filled chamber as recited in claim 18 wherein the infra-red radiation source includes a plurality of filaments which are located within the gas-filled chamber.

20. A method of microfabricating a hermetically sealed gas-filled chamber as recited in claim 18 wherein the infra-red radiation source includes a plurality of filaments which are located externally to the gas-filled chamber.

21. A method of microfabricating a hermetically sealed gas-filled chamber as recited in claim 20 wherein the infra-red radiation source further comprises a protective cover over the external filaments.

22. A method of microfabricating a hermetically sealed gas-filled chamber as recited in claim 21 wherein the filaments for the infra-red radiation source are vacuum-sealed within the protective cover.

23. A method of microfabricating a hermetically sealed gas-filled chamber as recited in claim 1 wherein the recited glass wafer is a silicon wafer having a layer of bondable glass applied thereon in the areas commensurate with the anodic bonding surface.

24. A method of microfabricating a hermetically sealed gas-filled chamber which contains a gas having a preselected concentration such that the pressure within the chamber is equal to a preselected value $P_c$ when the temperature of the chamber is at a preselected temperature $T_0$, the gas-filled chamber being microfabricated from a plurality of silicon and/or glass wafers such that a gas-filled cavity is located adjacent an interface between at least two of the wafers, the method of microfabricating the gas-filled chamber comprising:

etching a cavity in a first substrate made from one or more wafers, the cavity being adjacent and surrounded by an anodic bonding surface on the substrate;

placing the substrate with the etched cavity within a gas-filled anodic bonding environment, the gas-filled anodic bonding environment containing a concentration of gas substantially maintained at an anodic bonding temperature $T_{ab}$ and an anodic bonding pressure $P_{ab}$ wherein said bonding pressure $P_{ab}$ is substantially equal to $P_{ab}=P_c(T_{ab}/T_0)$ where $T_{ab}$ and $T_0$ are absolute temperature values and $P_{ab}$ and $P_c$ are absolute pressure values and $P_c$ is the preselected pressure value within the chamber when the chamber is at the preselected temperature $T_0$; and anodic bonding an enclosing wafer to the anodic bonding surface on the substrate while the substrate with the etched cavity is located within the gas-filled anodic bonding environment at temperature $T_{ab}$ and pressure $P_{ab}$, the anodic bonding in the gas-filled anodic bonding environment being implemented by aligning the enclosing wafer with the bonding surface of the substrate to form a bonding interface between the enclosing wafer and the substrate, contemporaneously capturing gas from the gas-filled anodic bonding environment within the cavity, and thereafter applying a bonding voltage across the bonding interface between the enclosing wafer and the substrate while the enclosing wafer and the substrate are aligned for bonding within the gas-filled anodic bonding environment to bond the interface and hermetically seal the selected concentration of gas therein.

25. A method as recited in claim 24 wherein the substrate with the cavities etched therein comprises a glass wafer having a hole etched therethrough bonded to a silicon wafer, and the enclosing wafer is a silicon wafer.

26. A method as recited in claim 24 wherein the substrate with the cavities etched therein is a silicon substrate having a layer of bondable glass applied thereon in areas commensurate with the anodic bonding surface, and the enclosing wafer is a silicon wafer.

27. A method as recited in claim 24 wherein the substrate with the cavity etched therein is a single glass wafer having a cavity etched therein, and the enclosing wafer is a silicon wafer.

28. A method as recited in claim 24 wherein the substrate having the cavity etched therein is a silicon substrate having a hole etched therein and the enclosing wafer is a glass wafer.

29. A method as recited in claim 24 wherein the substrate having a cavity etched therein is a silicon substrate and the enclosing wafer is a silicon wafer having a layer of bondable glass applied thereon in areas commensurate with the anodic bonding surface.

30. A method as recited in claim 24 wherein the substrate having a cavity etched therein comprises a silicon wafer having a hole etched therethrough bonded to a glass wafer, and the enclosing wafer is a glass wafer.

31. A method as recited in claim 24 wherein the substrate having a cavity etched therein is a silicon substrate made by etching a single silicon wafer, and the enclosing wafer is a glass wafer.

32. A method of microfabricating a hermetically sealed gas-filled chamber which contains a gas having a preselected concentration such that the pressure within the chamber is equal to a preselected value $P_c$ when the temperature of the chamber is at a preselected temperature $T_0$, the gas-filled chamber being microfabricated from two or more silicon wafers such that a gas-filled cavity is located adjacent the interface between two of the silicon wafers, the method of microfabricating the gas-filled chamber comprising the steps of:

etching a cavity in at least one of the silicon wafers, the cavity being adjacent and surrounded by a fusion bonding surface on the etched silicon wafer;

preparing the surfaces of the silicon wafers for fusion bonding;

placing the silicon wafers within a gas-filled bonding environment, the gas-filled fusion bonding environment comprising a concentration of a selected gas at a selected pressure;

initially bonding the silicon wafers together while the silicon wafers are located in the gas-filled bonding environment by aligning and engaging the respective fusion bonding surfaces on the respective silicon wafers to form a bonding interface therebetween while contemporaneously capturing the gas from the gas-filled bonding environment within the cavity; and thereafter applying a sufficient amount of thermal energy for a sufficient amount of time to strengthen the initial bonds and hermetically seal the chamber with the selected concentration of gas therein.

33. A method of microfabricating a hermetically sealed gas-filled chamber as recited in claim 32 wherein the initial bonding of the silicon wafer occurs at room temperature.

34. A method of microfabricating a hermetically sealed gas-filled chamber as recited in claim 32 wherein the step of applying a sufficient amount of thermal energy for a sufficient amount of time to strengthen the initial bonds and hermetically seal the chamber with the selected concentration of gas therein is implemented in two steps: the first step being an initial application of heat less than or equal to a first temperature and the second step being a second application of heat less than or equal to a second temperature, the second temperature being substantially greater than the first temperature.

35. A method of microfabricating a hermetically sealed gas-filled chamber as recited in claim 32, wherein the bonding pressure $P_{fb}$ in the gas-filled bonding environment is substantially greater than the preselected value $P_c$ for the pressure within the chamber when the temperature of the chamber is at or near the preselected temperature $T_0$.

36. A method of microfabricating a hermetically sealed gas-filled chamber as recited in claim 32 wherein the cavity is etched in a single silicon wafer.

37. A method of microfabricating a hermetically sealed gas-filled chamber as recited in claim 32 wherein the gas-filled chamber is filled with carbon dioxide gas.

38. A method of microfabricating a hermetically sealed gas-filled chamber as recited in claim 37 wherein the gas-filled bonding environment contains carbon dioxide gas having a bonding pressure $P_{fb}$ which is substantially greater than atmospheric pressure.

39. A method of microfabricating a hermetically sealed gas-filled chamber as recited in claim 32 wherein the gas-filled chamber is designed to be used as an optical filter and the method further comprises the step of applying an anti-reflective coating on at least one of the wafers along an optical path for infra-red radiation passing through the chamber.

40. A method of microfabricating a hermetically sealed gas-filled chamber as recited in claim 39 wherein the anti-reflective coating is a silicon oxide coating.

41. A method of microfabricating a hermetically sealed gas-filled chamber as recited in claim 39 wherein the anti-reflective coating is a silicon nitride coating.

42. A method of microfabricating a hermetically sealed gas-filled chamber as recited in claim 32 wherein the hermetically sealed gas-filled chamber is integral with an infra-red radiation source which is microfabricated on the same chip as the hermetically sealed gas-filled chamber.

43. A method of microfabricating a hermetically sealed gas-filled chamber as recited in claim 32 wherein the infra-red radiation source includes a plurality of filaments which are located within the gas-filled chamber.

44. A method of microfabricating a hermetically sealed gas-filled chamber as recited in claim 32 wherein the infra-red radiation source includes a plurality of filaments which are located externally to the gas-filled chamber.

45. A method of microfabricating a hermetically sealed gas-filled chamber as recited in claim 32 wherein the infra-red radiation source further comprises a protective cover over the external filaments.

46. A method of microfabricating a hermetically sealed gas-filled chamber as recited in claim 32 wherein the filaments for the infra-red radiation source are vacuum-sealed within the protective cover.

* * * * *